United States Patent
Trevethan

(10) Patent No.: US 12,056,694 B2
(45) Date of Patent: Aug. 6, 2024

(54) SECURE OFF-CHAIN BLOCKCHAIN TRANSACTIONS

(71) Applicant: nChain Licensing AG, Zug (CH)

(72) Inventor: Thomas Trevethan, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/116,050

(22) Filed: Mar. 1, 2023

(65) Prior Publication Data

US 2023/0237475 A1    Jul. 27, 2023

Related U.S. Application Data

(63) Continuation of application No. 16/613,784, filed as application No. PCT/IB2018/053289 on May 11, 2018, now Pat. No. 11,842,339.

(30) Foreign Application Priority Data

May 15, 2017    (GB) ..................................... 1707788

(51) Int. Cl.
   *G06Q 20/38*    (2012.01)
   *G06Q 20/06*    (2012.01)
   (Continued)

(52) U.S. Cl.
   CPC ....... *G06Q 20/3829* (2013.01); *G06Q 20/065* (2013.01); *H04L 9/0637* (2013.01);
   (Continued)

(58) Field of Classification Search
   CPC .. G06Q 20/065; G06Q 20/0658; G06Q 20/36; G06Q 20/3689; G06Q 20/382;
   (Continued)

(56) References Cited

U.S. PATENT DOCUMENTS

| | | | |
|---|---|---|---|
| 11,210,663 B2 * | 12/2021 | Voorhees | |
| 2016/0203572 A1 | 7/2016 | Mcconaghy et al. | |

(Continued)

FOREIGN PATENT DOCUMENTS

| | | |
|---|---|---|
| CN | 106022917 A | 10/2016 |
| CN | 106411503 A | 2/2017 |
| WO | 2013034278 A2 | 3/2013 |

OTHER PUBLICATIONS

Swan, "Blockchain: Blueprint for a New Economy," O'Reilly, Feb. 2015, 149 pages.
(Continued)

*Primary Examiner* — Neha Patel
*Assistant Examiner* — Yin Y Choi
(74) *Attorney, Agent, or Firm* — Davis Wright Tremaine LLP

(57) ABSTRACT

Provided herein is a computer-implemented method, a system, and a non-transitory computer-readable storage medium. The system may be implemented using a blockchain network. The computer-implemented method includes: i) attaching a digital asset of a first entity to an exchange platform; ii) computing a first shared key associated with the digital asset using a key of the first entity and a first key of the exchange platform; iii) generating and broadcasting a first blockchain transaction to a blockchain network; and iv) initiating, by the first entity, transfer of ownership of the digital asset from a first entity to a second entity; v) computing a second key and a second shared key; vi) replacing the first key associated with the exchange platform with the second key associated with the exchange platform; and vii) detaching, by the second entity, the deposit from the exchange platform using the second shared key.

15 Claims, 16 Drawing Sheets

(51) Int. Cl.
*H04L 9/06* (2006.01)
*H04L 9/32* (2006.01)
*H04L 9/00* (2022.01)

(52) U.S. Cl.
CPC .......... *H04L 9/3236* (2013.01); *H04L 9/3247* (2013.01); *G06Q 2220/00* (2013.01); *H04L 9/50* (2022.05); *H04L 2209/56* (2013.01)

(58) Field of Classification Search
CPC ............... G06Q 20/3829; G06Q 50/01; G06Q 2220/00; G06Q 20/326; G06Q 20/3267; G06Q 20/384
USPC .......................................................... 705/71
See application file for complete search history.

(56) References Cited

U.S. PATENT DOCUMENTS

| | | | |
|---|---|---|---|
| 2016/0292672 A1* | 10/2016 | Fay et al. | |
| 2017/0083907 A1 | 3/2017 | McDonough et al. | |
| 2017/0132620 A1 | 5/2017 | Miller et al. | |
| 2018/0276663 A1* | 9/2018 | Arora | |
| 2019/0244186 A1* | 8/2019 | Guo et al. | |
| 2020/0036519 A1* | 1/2020 | Bitauld et al. | |
| 2021/0304198 A1* | 9/2021 | Lingappa | |

OTHER PUBLICATIONS

Antonopoulos, "Mastering Bitcoin—Unlocking Digital Cryptocurrencies," O'Reilly Media, Inc., Dec. 20, 2014, 282 pages.
Franco, "Understanding Bitcoin: Cryptography, Engineering and Economics," Wiley, ISBN: 978-1-119-01916-9, Oct. 2014, 144 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
International Search Report and Written Opinion mailed Aug. 3, 2018, Patent Application No. PCT/IB2018/053289, 10 pages.
Nakamoto, "Bitcoin: A Peer-to-Peer Electronic Cash System," Bitcoin, Oct. 31, 2008, https://bitcoin.org/bitcoin.pdf, 9 pages.
OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
Satoshi et al., "Connection Limits," Bitcoin Forum, Aug. 9, 2010, https://bitcointalk.org/index.php?topic=741.0;prev_next=prev, 2 pages.
UK Commercial Search Report mailed Jun. 12, 2017, Patent Application No. GB510912, 6 pages.
UK IPO Search Report mailed Oct. 9, 2017, Patent Application No. GB1707788.4, 6 pages.
Poon, "The Bitcoin Lightning Network", DRAFT Version 0.5, 2015, 23 pages.
Gennaro et al., "Threshold-Optimal DSA/ECDSA Signatures and an Application to Bitcoin Wallet Security," retrieved from https://eprint.iacr.org/2016/013.pdf, 2016, 42 pages.
Bitbank, Inc. "The Impact of the Blockchain" Editorial Committee, 2016, Printed in Japan, 16 pages.
Nikkei Business Publications, Inc., "Blockchain & Bitcoin", 2016, 4 pages.
bitsharestalk.org, "Stealth Status Update", Dec. 6, 2017, https://bitsharestalk.org/index.php?topic=22138.75, 33 pages.
Goldfeder et al., "Securing Bitcoin Wallets via a New DSA/ECDSA Threshold Signature Scheme" Mar. 8, 2015, 26 pages.

* cited by examiner

SECURE OFF-CHAIN BLOCKCHAIN TRANSACTIONS

CROSS REFERENCE TO RELATED APPLICATIONS

This application is a continuation of U.S. patent application Ser. No. 16/613,784, filed Nov. 14, 2019, entitled "SECURE OFF-CHAIN BLOCKCHAIN TRANSACTIONS," which is a 371 National Stage of International Patent Application No. PCT/IB2018/053289, filed May 11, 2018, which claims priority to United Kingdom Patent Application No. 1707788.4, filed May 15, 2017, the disclosures of which are incorporated herein by reference in their entirety.

This invention relates generally to blockchain technologies and transactions, and more particularly to off-chain transactions between parties via an intermediary computer system. The invention is particularly suited, but not limited to, creating off-chain transactions between untrusted parties via an exchange platform that is trusted to implement and operate the transaction protocol without storing any information that could be used by an attacker to compromise the transactions. The transactions may be created to enable broadcast to a blockchain network for recording on a blockchain. Thus, the invention provides a more secure solution for the recording of transactions to a blockchain.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to as a useful application of the technological improvements described herein for the purpose of convenience and illustration, it should be noted that Bitcoin provides merely a useful application of the technology. The invention is not limited to use with the Bitcoin blockchain and alternative blockchain implementations and protocols, including implementations and protocols involving non-commercial applications, fall within the scope of the present invention. For example, the invention may be useful in other blockchain implementations that have similar constraints on verification of the blockchain and/or verification of the cryptocurrency transactions as Bitcoin. As an example, techniques of the present disclosure are applicable to other aspects involving inter-computer negotiation regardless of whether an exchange of cryptocurrency occurs.

A blockchain is a consensus-based, electronic ledger which is implemented as a computer-based decentralised, distributed system made up of blocks which in turn are made up of transactions. A blockchain is also referred to a peer-to-peer electronic ledger as there is no centralized system for managing the ledger and the transactions of the ledger are validated using a consensus protocol between the nodes of the distributed system. In some examples, a "blockchain transaction" refers to an input message encoding a structured collection of field values comprising data and a set of conditions, fulfilment of the set of conditions being prerequisite for the set of fields to be written to a blockchain data structure. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction (Tx) to be written to the blockchain, it must be "validated". Validity is determined, by the nodes, based on a common set of rules that are used by a majority of nodes with block generation power. For example, in the Bitcoin protocol, some network nodes act as miners and perform work to ensure that each transaction is valid, with invalid transactions rejected from the network. Miners perform work to ensure that each transaction is valid, with invalid transactions rejected from the network. For example, software clients installed on the nodes perform this validation work on transactions that reference unspent transaction outputs (UTXO) by executing associated locking and unlocking scripts. If executions of the locking and unlocking scripts evaluate to TRUE and, if certain other conditions are met, the transaction is valid and the transaction is written to the blockchain. Thus, in order for a transaction to be written to the blockchain, it must be i) validated by a node that receives the transaction (i.e., if the transaction is validated, the node relays it to the other nodes in the network); ii) added to a new block built by a miner; and iii) mined (i.e. added to the public ledger of past transactions).

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing, etc.) while being more versatile in their applications.

DLT technologies such as the Bitcoin system provide a censorship resistant method to exchange an asset or value without requiring trust in a centralised institution. However, the decentralised and distributed nature of Bitcoin comes at the cost of limited scalability and the fact that transactions take a substantial amount of time to be processed. For example, a new block is validated approximately every ten minutes and it is usually recommended that at least six blocks are generated on top of a transaction for it to be considered reliably confirmed. In some examples, transactions must wait considerably longer than this for reliable confirmation. These considerable delays for on-chain transactions may lead to unacceptable friction in many applications, particularly in retail at point-of-sale or where assets are traded with high frequency such as on currency exchanges.

Cryptocurrency exchanges can play a role in the functioning of the digital currency ecosystem. They provide the primary method of converting fiat currency into digital assets and vice versa, facilitating the trade of Bitcoins with other alt-coins, as well as offering off-chain payment features. In order to operate efficiently, exchanges must enable participants to transfer assets with minimum friction, which is fundamentally incompatible with on-chain transaction confirmations. As a result, most cryptocurrency exchange platforms retain control of customer deposits (and the corresponding private keys), acting in the same way as a bank, and the balance of customer accounts are maintained on a private, internal database. This enables any transaction between two parties interacting with a particular exchange to only require changes to this internal database, which can be performed instantly. By holding customer deposits, a cryptocurrency exchange can facilitate off-chain transactions in the same way that a traditional bank processes payments between accounts. However, such cryptocurrency exchanges may be limited to use by customers with deposits (and corresponding keys) that are registered with the exchange.

Thus, it is desirable to provide methods and systems that improve blockchain technology in one or more of these aspects.

Thus, in accordance with the invention, there is provided a method as defined in the appended claims.

As will be described in greater detail below, computer-implemented methods and electronic devices are configured to implement instant off-chain transactions between computer systems (e.g., mutually untrusted computer systems, also referred to as "parties") via an exchange platform that is trusted to implement and operate the transaction protocol, without requiring an on-chain transaction. The off-chain transactions enable one computer system to generate multiple transactions that are recordable to a blockchain in different circumstances to ensure that a suitable transaction can be recorded to the blockchain depending on how another computer system involved in the multiple transactions operated after generation of the transactions.

"Off-chain" may mean that the operation is not performed via a blockchain. In order to remain secure, the platform may be trusted only to follow the specified algorithm without storing information from previous states. Information stored by the exchange can be obtained by a malicious actor without compromising the validity of the off-chain transactions because the information stored by the exchange may not be used to obtain the full key needed to generate additional transactions based on the off-chain transactions. Additionally, at least some of the off-chain transactions are valid for recording on the blockchain even in the event of a catastrophic failure of the exchange (e.g., exchange going permanently off-line or loosing key shares).

As described below, through the use of elliptic curve cryptography, the full private key (and thus, the ownership of the digital asset) can be proven at any time. The computer-implemented methods and electronic devices that are configured to implement instant off-chain transactions of digital assets between mutually untrusted parties via an exchange platform system described herein enable the near-instant creation of off-chain transactions while maintaining autonomy for the participants. It should be noted that "instant" may mean "substantially instant" or including a degree of variation. The term will be understood by the person skilled in the art in accordance with the context of the field of the present invention.

Therefore, in accordance with the invention there may be provided a computer-implemented method (and corresponding system(s)) as defined in the appended claims.

The method may be described as an instant off-chain transaction (Tx) (which may be referred to as a transfer, such as in cryptocurrency applications). Additionally or alternatively, it may be described as a security or control method for securing or controlling the recording of certain transactions to a blockchain. As an illustrative example, the operation of a first computer system and a second computer system may be interdependent such that the operations of one computer system depend on operations of the other. For instance, the first computer system may trigger operations of the second computer system, but may execute first logic if the second computer system performs an operation and may execute second logic if the second computer system does not perform the operation. The techniques described herein enable the first computer system to have cryptographic assurances that it is able to execute either the first logic or second logic, depending on what the second computer system does. The first logic may result, for example, in recording of a first transaction to the blockchain and the second logic may result, for example, in recording of a second transaction to the blockchain. In an embodiment, the second computer can either (1) ensure that its performance of the operation enables recording of the first transaction to the blockchain; or (2) ensure that performance of the operation prevents recording of the second transaction to the blockchain; or (3) both.

Thus, the method described herein allows for interdependent computer system operation in a manner that enables, via blockchain transactions, the ability to achieve a desired state regardless of whether a participant (with the other computer system or the exchange platform) operates suitably.

As noted above, techniques described and suggested herein are applicable in a wide variety of contexts. Some contexts utilize a blockchain to manage a digital asset. The digital asset may be represented by a value that is recorded in a transaction on a blockchain. A record of a digital asset (or aggregate of records aggregating to the value) may be a prerequisite for entry of certain transactions on the blockchain, such as transactions that are said to "transfer" or "transfer control of" the digital asset. In some examples, the digital asset is a value whose transfer enables the execution of certain computer system logic. For instance, a computer system's programming may depend on a record of a digital asset whose appearance in the blockchain was caused by another computer. In some example, the digital asset (and the value(s) corresponding to the digital asset in a set of blockchain transactions, represents an amount of work for a computer system to perform, data to be processed by a computer system, or other inputs to algorithms executed by computer systems. In some examples, the digital asset is a portion or amount of cryptocurrency, although the scope of the present disclosure is widely applicable to other contexts that do not involve payments or cryptocurrency in general.

In an embodiment, a transaction (Tx) is between mutually untrusted parties via an exchange platform method. The computer-implemented method may include: i) attaching a digital asset of a first party (which may be a computer system or other such entity) to an exchange platform by: a) computing a first shared (cryptographic) key associated with the digital asset using a key of or otherwise associated with the first party and a first key of or otherwise associated with the exchange platform; and b) depositing the digital asset to a blockchain network by: 1) generating a funding transaction payable to any party from the digital asset using the first shared key; and 2) broadcasting the funding transaction to the blockchain network; and ii) reassociating the digital asset from the first party to a second party (which may be a computer system or other such entity) by: a) computing a second key of the exchange platform using a key of or otherwise associated with the second party such that: 1) the key of the first party becomes invalid; and 2) a second shared key associated with the digital asset that is computed from the key of the second party and the second key of the exchange platform is equal to the first shared key associated with the digital asset; and b) replacing the first key of the exchange platform with a second key of the exchange platform.

In accordance with the invention, there may be provided an electronic device. The electronic device includes an interface device, a processor coupled to the interface device and a memory coupled to the processor. The memory may have stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

In accordance with the invention, there may be provided a computer readable storage medium including a elliptic curve digital signature algorithm (ECDSA) script comprising computer executable instructions which, when executed, configure a processor to perform functions of a elliptic curve digital signature algorithm described herein.

In accordance with the invention, there may be provided a computer readable storage medium including a two-party elliptic curve digital signature algorithm (two-party ECDSA) script comprising computer executable instructions which, when executed, configure a processor to perform functions of a two-party elliptic curve digital signature algorithm described herein.

In accordance with the invention, there may be provided a computer readable storage medium including a cryptographically secure pseudo-random number generator (CSPRNG) script comprising computer executable instructions which, when executed, configure a processor to perform functions of a cryptographically secure pseudo-random number generator described herein.

In accordance with the invention, there may be provided a computer-implemented method comprising: computing a first shared key associated with a digital asset using a key of a first party and a first key of an exchange platform; depositing the digital asset to a blockchain network by at least: generating a funding transaction payable to any party from the digital asset using the first shared key; and broadcasting the funding transaction to the blockchain network; and reassociating the digital asset from the first party to a second party by at least: computing a second key of the exchange platform using a key of the second party such that: the key of the first party becomes invalid; and a second shared key associated with the digital asset that is computed from the key of the second party and the second key of the exchange platform is equal to the first shared key associated with the digital asset; and replacing the first key of the exchange platform with a second key of the exchange platform.

In accordance with the invention, there may be provided a computer-implemented method as described above that further comprises detaching the digital asset from the exchange platform by at least: generating a second funding transaction payable to the second party from the digital asset using the first shared key, the second funding transaction based at least in part on the funding transaction; broadcasting the second funding transaction to the blockchain network; and mining the second funding transaction to provide the digital asset to the second party.

In accordance with the invention, there may be provided a computer-implemented method as described above wherein attaching the digital asset of the first party to the exchange platform further comprises: generating a first refund transaction payable to the first party from the digital asset using a first refund key; broadcasting the first refund transaction to the blockchain network after a first time period; and mining the first refund transaction to return the digital asset to the first party.

In accordance with the invention, there may be provided a computer-implemented method as described above wherein the first refund transaction is cooperatively signed by the exchange platform and the first party using a two-party elliptic curve digital signature algorithm. Reassociating the digital asset from the first party to the second party may comprise: generating a second refund transaction payable to the second party from the digital asset using a second refund key; broadcasting the second refund transaction to the blockchain network after a second time period; and mining the second refund transaction to return the digital asset to the second party. The second refund transaction is cooperatively signed by the exchange platform and the second party using a two-party elliptic curve digital signature algorithm.

In accordance with the invention, there may be provided a computer-implemented method as described above wherein computing the first shared key comprises: computing a first candidate shared key by at least: computing a first public key corresponding to the second key of the exchange platform using elliptic curve cryptography; providing the first public key to the second party; and computing the first candidate shared key from the first public key and the key of the second party using elliptic curve cryptography; computing a second candidate shared key by at least: computing a second public key corresponding to the key of the second party using elliptic curve cryptography; providing the second public key to the exchange platform; and computing the second candidate shared key from the second public key and the second key of the exchange platform using elliptic curve cryptography; and verifying that the first candidate shared key is the same as the second candidate shared key.

In accordance with the invention, there may be provided a computer-implemented method as described above wherein the second shared key associated with the digital asset is computed by at least: computing a first candidate shared key by at least: computing a first public key corresponding to the first key of the exchange platform using elliptic curve cryptography; providing the first public key to the first party; and computing the first candidate shared key from the first public key and the key of the first party using elliptic curve cryptography; computing a second candidate shared key by at least: computing a second public key corresponding to the key of the first party using elliptic curve cryptography; providing the second public key to the exchange platform; and computing the second candidate shared key from the second public key and the first key of the exchange platform using elliptic curve cryptography; and verifying that the first candidate shared key is the same as the second candidate shared key.

In accordance with the invention, there may be provided a computer-implemented method as described above wherein reassociating the digital asset from the first party to the second party comprises reassociating a portion of the digital asset from the first party to the second party.

In accordance with the invention, there may be provided a computer-implemented method as described above wherein replacing the first key of the exchange platform with the second key of the exchange platform comprises: multiplying the first key of the exchange platform by a random value to produce a blinded first key of the exchange platform; providing the blinded first key of the exchange platform to the second party; multiplying the blinded first key of the exchange platform by a multiplicative inverse of the key of the second party to produce a first intermediary key; providing the first intermediary key to the first party; multiplying the first intermediary key by the key of the first party to produce a second intermediary key; providing the second intermediary key to the exchange platform; and multiplying the second intermediary key by a multiplicative inverse of the random value to generate the second key of the exchange key.

In accordance with the invention, there may be provided a computer-implemented method as described above wherein replacing the first key of the exchange platform with the second key of the exchange platform invalidates the first key of the exchange platform.

In accordance with the invention, there may be provided a computer-implemented method as described above wherein: the key of the first party is a private key securely maintained by the first party; the first key of the exchange platform is a private key securely maintained by the exchange platform; the key of the second party is a private key securely maintained by the second party; and the second key of the exchange platform is a private key securely maintained by the exchange platform.

In accordance with the invention, there may be provided a computer-implemented method as described above wherein the exchange platform includes a trusted execution environment that: stores the first key of the exchange platform; stores the second key of the exchange platform; and provides a remote attestation that an exchange protocol associated with the exchange platform is being followed by the exchange platform.

In accordance with the invention, there may be provided a system, comprising: a processor; and memory including executable instructions that, as a result of execution by the processor, causes the system to perform a computer-implemented method as described above.

In accordance with the invention, there may be provided a non-transitory computer-readable storage medium having stored thereon executable instructions that, as a result of being executed by a processor of a computer system, cause the computer system to at least perform a computer-implemented method as described above.

These and other aspects of the present invention will be apparent from and elucidated with reference to, the embodiment described herein. An embodiment of the present invention will now be described, by way of example only, and with reference to the accompanying drawings, in which.

Figure 1:
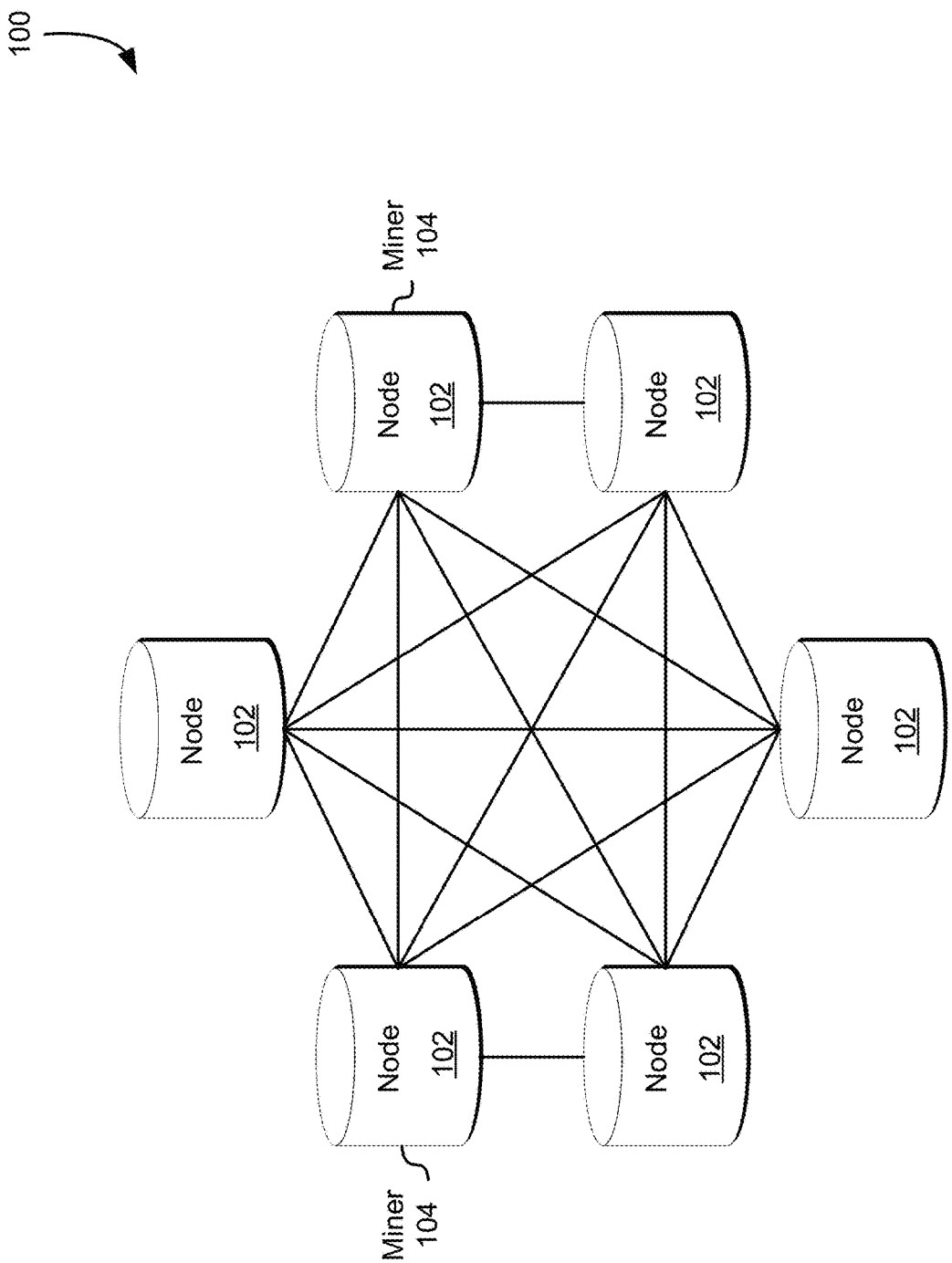
FIG. 1 illustrates a block diagram of an example blockchain network.

Reference will first be made to FIG. 1 which illustrates, in block diagram form, an example blockchain network 100 associated with a blockchain. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches, or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used. Nodes 102 maintain a global ledger of all transactions on the blockchain. Thus, the global ledger is a distributed ledger. Each node 102 may store a complete copy or a partial copy of the global ledger. Transactions by a node 102 affecting the global ledger are verified by other nodes 102 so that the validity of the global ledger is maintained. When the blockchain is a proof-of-work based blockchain, blocks are also verified by checking the proof of work submitted with the block.

At least some of the nodes 102 operate as miners 104 of the blockchain network 100. The blockchain network 100 of FIG. 1 is a proof-of-work block chain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with double SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The other nodes 102 also verify that the block itself is valid (e.g., that the transactions and block-header of the block are valid) before accepting that the block should be added to the blockchain. The block is added to the blockchain (i.e., to the distributed global ledger) by consensus of the nodes 102.

The block created by the miner 104 includes transactions which had been broadcast to the blockchain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to "spend" the Bitcoin) by signing the request using a private key corresponding to their public key. The transfer is only added to the block if the request is validly signed. A party (e.g., computer system) able to spend a transaction is also said to be able to "unlock" the transaction.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 may not operate as miners and may, instead, participate as validating nodes. Validation of transactions may involve checking signature(s) or other conditions specified in a locking script, confirming reference to valid UTXO, etc. The example of FIG. 1 includes six nodes 102, two of which are participating as miners 104. In practice, the number of nodes 102 or miners 104 may be different. In many blockchain networks, the number of nodes 102 and miners 104 may be much greater than the number illustrated in FIG. 1.

Figure 2:
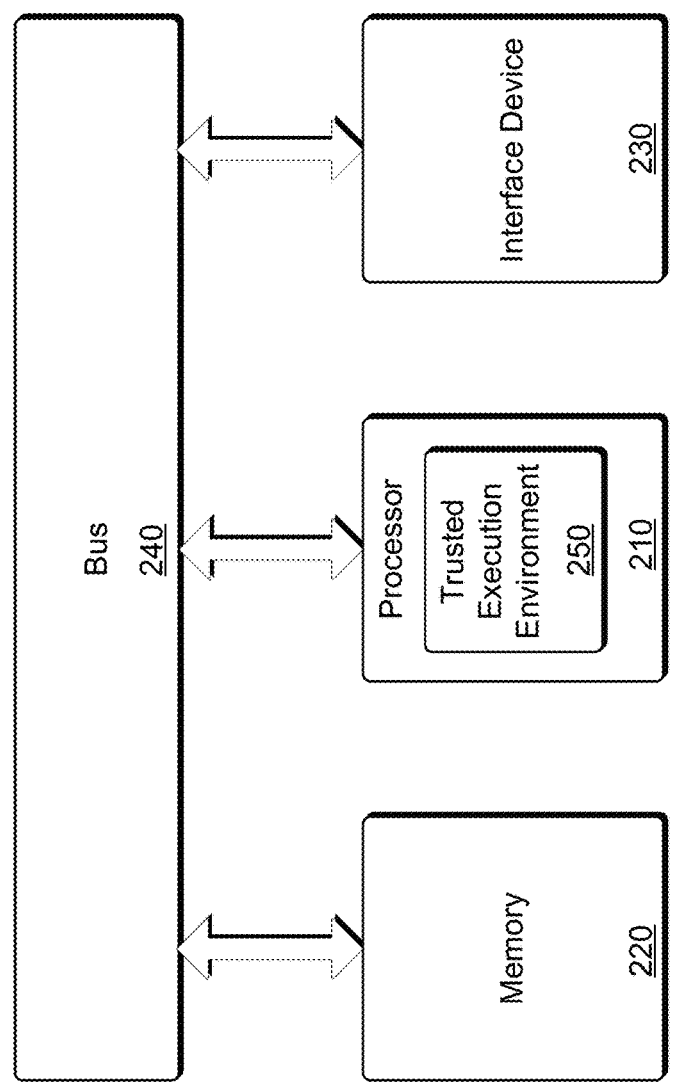
FIG. 2 illustrates a block diagram of an example electronic device which may function as a node in a blockchain network.

FIG. 2 illustrates, in block diagram form, an example electronic device 200 which may function as a node (e.g. a node such as one of the nodes 102 illustrated in connection with FIG. 1) in a blockchain network (e.g., a blockchain network such as the blockchain network 100 illustrated in connection with FIG. 1). The example electronic device 200 may function as a node such as one of the nodes 102 illustrated in connection with FIG. 1 in a blockchain network such as the blockchain network 100 illustrated in connection with FIG. 1. In an embodiment, the block chain network is a peer-to-peer blockchain network.

The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with a blockchain network (e.g., the block chain network 100 described in connection with FIG. 1). For example, the instructions may include instructions for implementing the Bitcoin protocol.

The memory 220 may store the global ledger of a blockchain network (e.g., the block chain network 100 described in connection with FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a trusted execution environment (TEE). The TEE 250 is an isolated execution environment which provides additional security to the electronic device 200 such as isolated execution, integrity of trusted applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as cryptographic keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating a node (e.g., the nodes 102 described in connection with FIG. 1) that includes the TEE 250.

The TEE 250 may operate to instantiate a secure execution environment (also referred to herein as an "enclave") and then add pages of memory one at a time, while cumulatively hashing the added pages of memory. In an embodiment, the hashing of the memory pages is performed on a remote machine (e.g., a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed once the enclave is locked down. A final hash may be signed by an attestation key and may be made available to a data owner to verify it before the data owner sends any secrets to the enclave.

The TEE 250 may be used to protect the confidentiality and integrity of shared keys stored in the exchange as described below. For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The protocol is also robust against the compromise of a threshold of enclaves. Further, the TEE 250 may enable remote attestation which may be used by a node (e.g. a node such as one of the nodes 102 illustrated in connection with FIG. 1) to prove to other nodes that a TEE 250 is authentic and is running approved computer executable instructions for a protocol that is implemented by the blockchain network 100. Remote attestation may be provided by the TEE 250 by running a particular piece of code and sending a hash of the code, internal to the enclave, signed by an internal attestation key for the enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given has of member known as a quote. A third-party attestation service such as Intel Attestation Service (IAS) may certify that these signed statements originate from authentic CPUs conforming to the SGX specification.

The present invention may provide methods (and corresponding systems) arranged to modify a cryptographic public key embedded in the locking script of a blockchain transaction (Tx) using undetermined data provided in an unlocking script of another transaction. When used in conjunction with signature checking opcodes in, for example, the Bitcoin protocol (e.g., OP_CHECKSIG), which uses the transaction bytecode as a message, both the transaction and data require approval or authorisation from the owner of the public key. This secures them from alteration.

A method described herein uses one or more digital signature schemes to verify various transactions. The digital signature scheme may be an Elliptic Curve Digital Signature Algorithm (ECDSA) scheme. The digital signature scheme may also be a two-party ECDSA scheme. The digital signature scheme may also be a threshold ECDSA scheme. The scheme may be used to construct a valid signature without having to reconstruct a private key and without any party having to reveal their key share to another party. For example, in a two-party ECDSA scheme, there are two parties and both parties are required to reconstruct a private key. However, in an ECDSA scheme, when creating the signature corresponding to the shared private key, it may not be necessary for the private key to be reconstructed to generate the signature. In an embodiment, the signature corresponding to the shared private key is generated without reconstructing (i.e., regenerating) the shared private key.

This ECDSA scheme includes various mechanisms which could be used by the nodes such as the nodes 102 described in connection with FIG. 1 to identify a malicious or uncooperative party. For example, verifiable secret sharing (VSS) may be used to share a polynomial required for Shamir's secret sharing (SSS). SSS is a form of secret sharing in which a secret is divided into parts and provided to each participant in its own unique part. These parts may be used to reconstruct the secret. VSS may be used, by the nodes to identify a malicious node or member if inconsistent shares are provided to different nodes or if a share is secretly sent to a node that is different than the blinded share which is broadcast to all nodes. Inconsistent shares may be identified by any one of the nodes. The sharing of the secret may be made verifiable by including auxiliary information which allows nodes to verify their shares as consistent.

The sending of an incorrect share to an individual node (i.e., a share that is different than the blinded share that is broadcast) can be identified by the intended recipient node of the share. The identification of an incorrect share being secretly sent to a node can be rendered publicly verifiable using techniques of publically verifiable secret sharing (PVSS). Such techniques may avoid a possible delay in the identification of a cheating sender which might occur where PVSS is not used and a recipient of an incorrect share is off line or cut off from a substantial fraction of the network when the incorrect share is sent.

Misbehaviour, such as providing inconsistent shares to different nodes, may be addressed by the network to deter malicious behaviour. For example, when a node is identified by other nodes as a malicious party, a number of nodes may cooperate to penalize the malicious party. For example, the nodes may take action involving a digital asset (such as digital currency, tokens or other stake or value) deposited to a blockchain network by the malicious party. For example, the blockchain network may burn the digital currency, tokens, stake or value by transferring them to an unspendable address or the blockchain network may confiscate such digital assets by coming to a consensus with other nodes to refuse. The nodes that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, a threshold ECDSA signature technique may contemplate a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small proportion of malicious adversaries relative to the total number of key shares.

For example, if all nodes have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, which would be quite expensive. Moreover, by carrying out the attack, a large percentage of the value of the stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself. Hence, a corrupted node cannot send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature.

In one or more embodiments, other threshold schemes may be used including non-ECDSA signature schemes.

Nodes in the blockchain network may implement an exchange protocol based on the selected digital signature scheme. Such nodes may include computer-executable instructions stored in memory 220 which implement the exchange protocol. Such instructions, when executed by a processor 210, cause a node (such as the electronic device 200) to perform one or more methods of the exchange protocol. Such methods may include, but may not be limited to, methods implemented by any one or combination of the processes 300, 500, 800, 1300, or 1500 of FIGS. 3, 5, 8, 13, and 15. Thus, the exchange protocol may include one or more of the processes 300, 500, 800, 1300, or 1500 of FIGS. 3, 5, 8, 13, and 15. The processes may be performed by a node or may be performed cooperatively with other nodes of the blockchain network.

Figure 3:
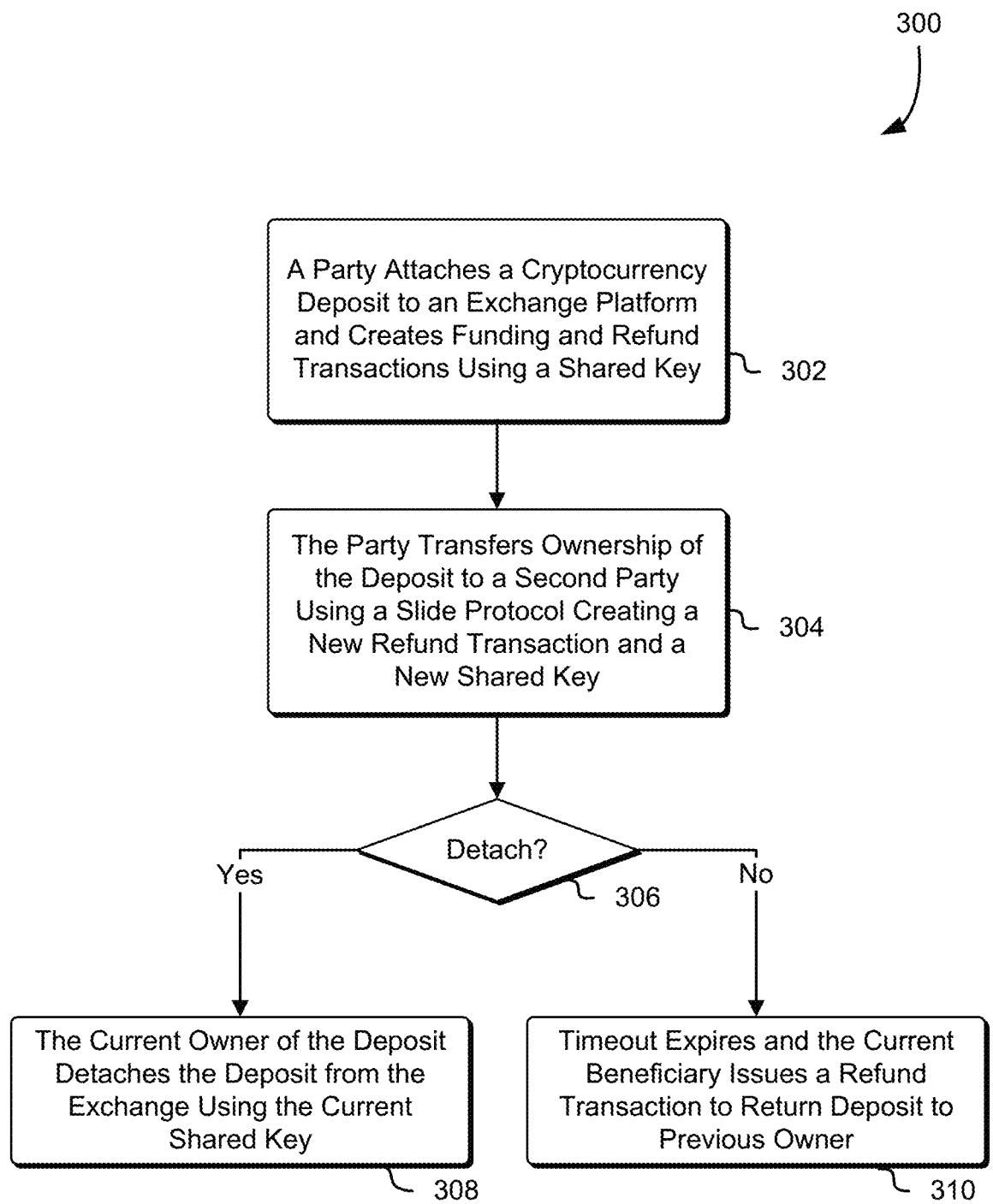
FIG. 3 illustrates a flowchart of an example process for performing an off-chain cryptocurrency transaction between untrusted parties using an exchange platform.

FIG. 3 illustrates, in flowchart form, an example process 300 for performing an off-chain cryptocurrency transaction between untrusted parties using an exchange platform. The process 300 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 300 for performing an off-chain cryptocurrency transaction between untrusted parties using an exchange platform described in connection with FIG. 3.

In step 302 of the example process 300 for performing an off-chain cryptocurrency transaction between untrusted parties using an exchange platform, a party attaches a cryptocurrency deposit to an exchange platform and creates funding and refund transactions using a shared key as described below at least in connection with FIGS. 4-6.

In step 304 of the example process 300 for performing an off-chain cryptocurrency transaction between untrusted parties using an exchange platform, the party transfers ownership of the deposit to a second party (i.e., reassociates the deposit from the first party to the second party) using a slide protocol creating a new refund transaction and a new shared key as described below at least in connection with FIGS. 7-11.

In step 306 of the example process 300 for performing an off-chain cryptocurrency transaction between untrusted parties using an exchange platform, it is determined whether to detach the cryptocurrency transaction from the exchange platform (i.e., it is determined, by the current owner, whether to claim the cryptocurrency deposit).

Figure 12:
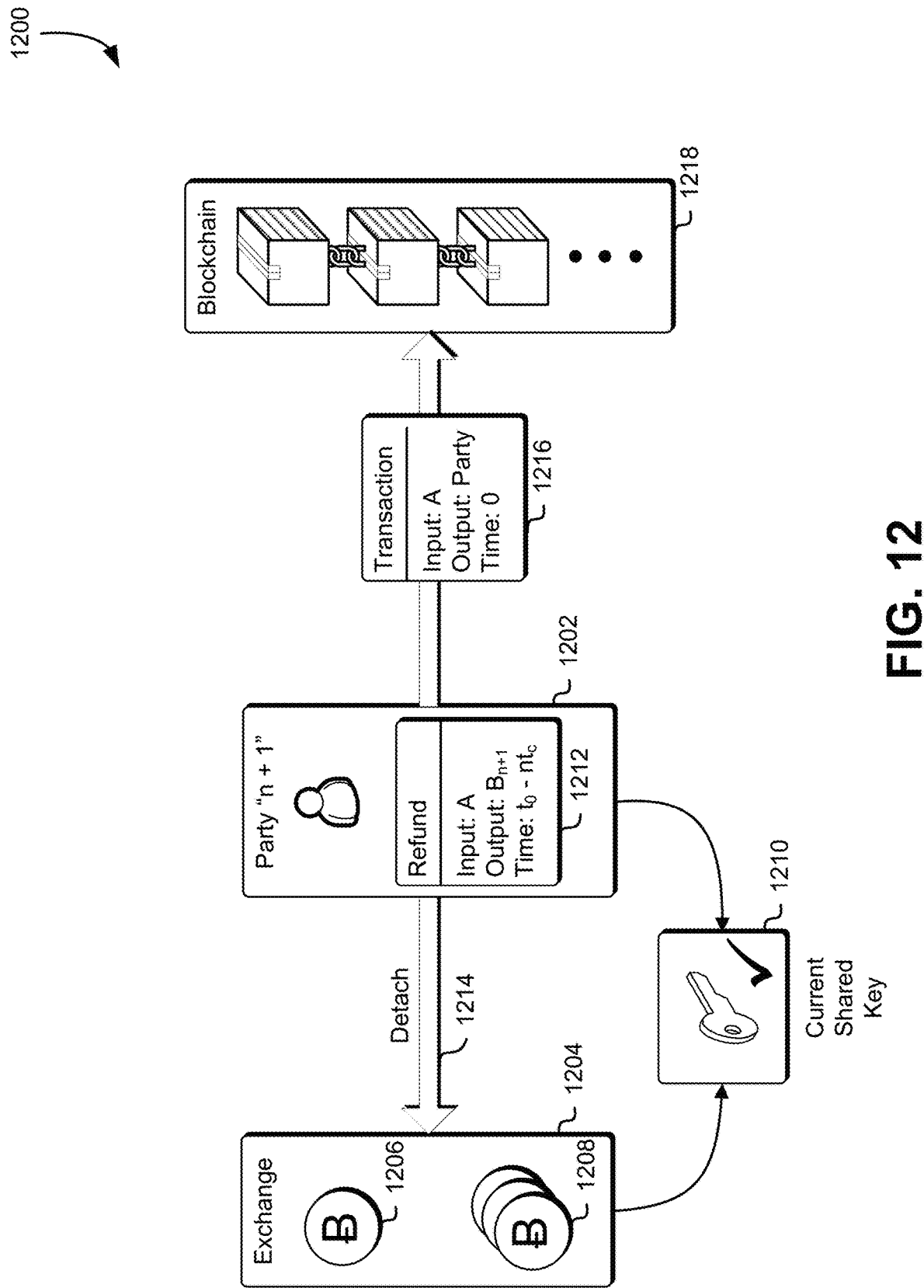
FIG. 12 illustrates a block diagram of an example environment where a detachment phase of an off-chain cryptocurrency transaction between untrusted parties is performed using an exchange platform.
Figure 13:
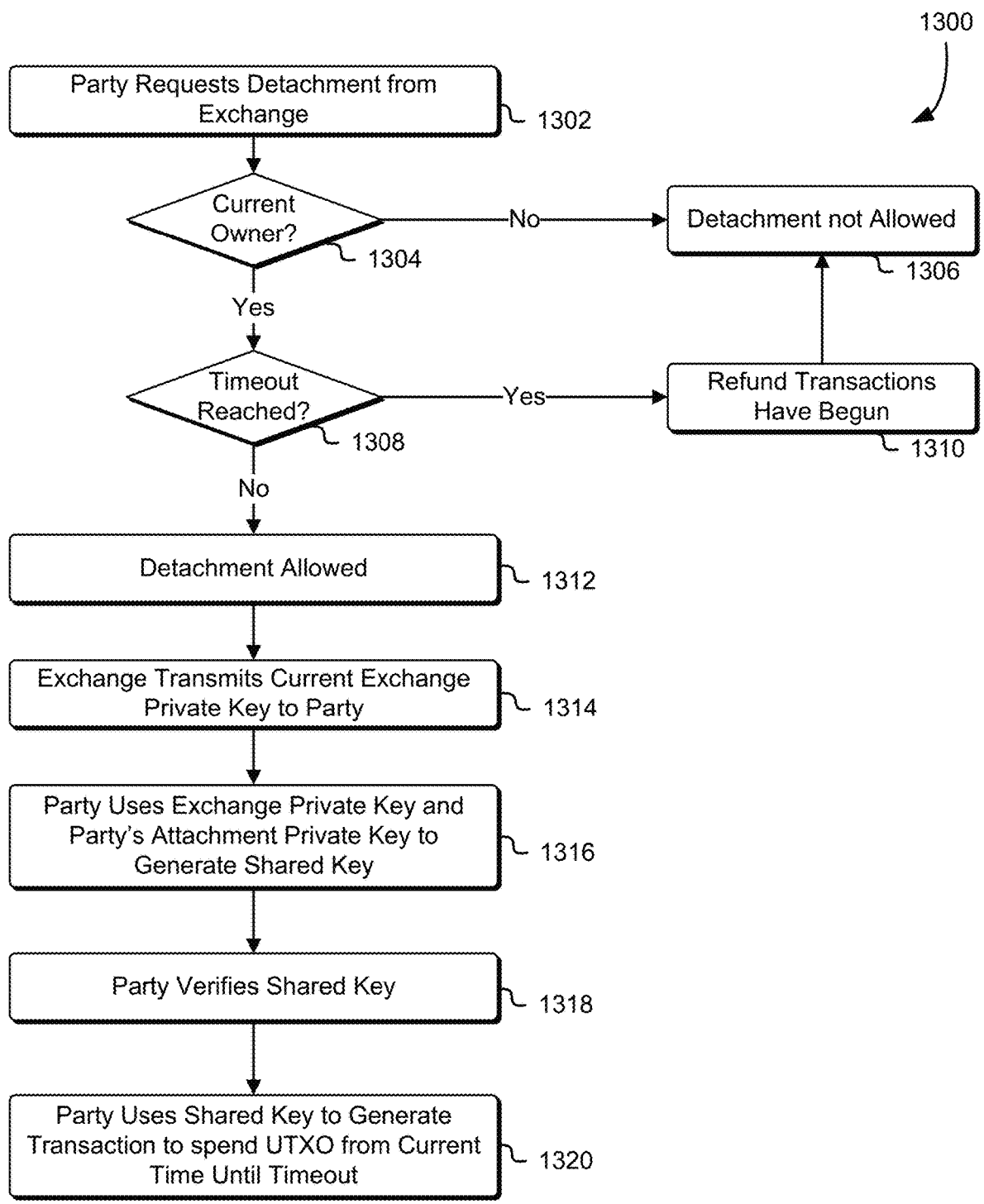
FIG. 13 illustrates a flowchart of an example process for performing a detachment phase of an off-chain cryptocurrency transaction between untrusted parties using an exchange platform.

If, in step 306 of the example process 300 for performing an off-chain cryptocurrency transaction between untrusted parties using an exchange platform, it is determined to detach the cryptocurrency transaction from the exchange platform, in step 308 of the example process 300 for performing an off-chain cryptocurrency transaction between untrusted parties using an exchange platform, the current owner of the deposit detaches the deposit from the exchange using the current shared key as described below at least in connection with FIGS. 12 and 13.

Figure 14:
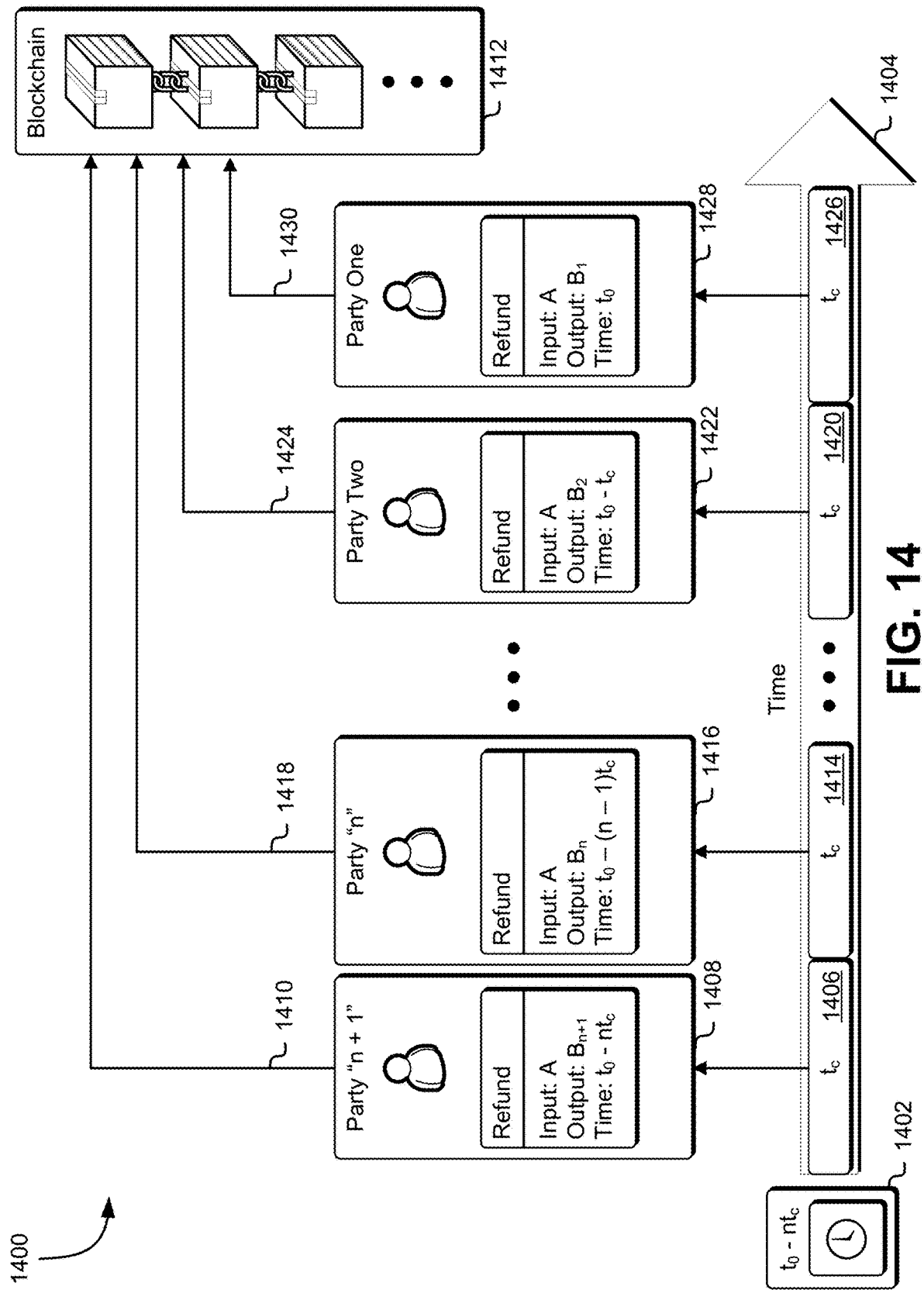
FIG. 14 illustrates a block diagram of an example environment where a refund phase of an off-chain cryptocurrency transaction between untrusted parties is performed using an exchange platform.
Figure 15:
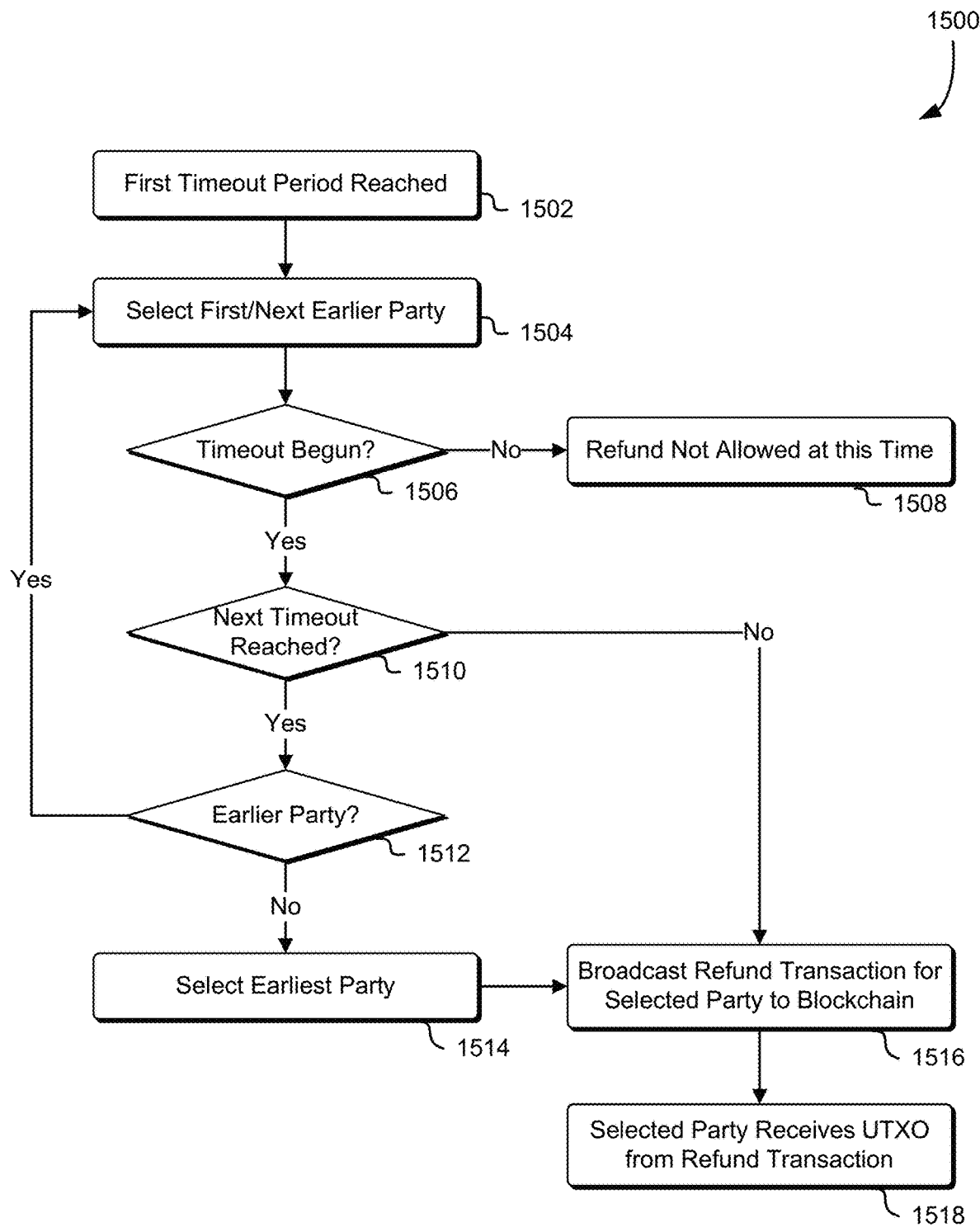
FIG. 15 illustrates a flowchart of an example process for performing a refund phase of an off-chain cryptocurrency transaction between untrusted parties using an exchange platform.

If, in step 306 of the example process 300 for performing an off-chain cryptocurrency transaction between untrusted parties using an exchange platform, it is not determined to detach the cryptocurrency transaction from the exchange platform, in step 310 of the example process 300 for performing an off-chain cryptocurrency transaction between untrusted parties using an exchange platform, the timeout expires and the current beneficiary issues a refund transaction to return deposit to previous owner as described below at least in connection with FIGS. 14 and 15.

Note that one or more of the operations performed in the example process 300 illustrated in FIG. 3 may be performed in various orders and combinations, including in parallel.

Figure 4:
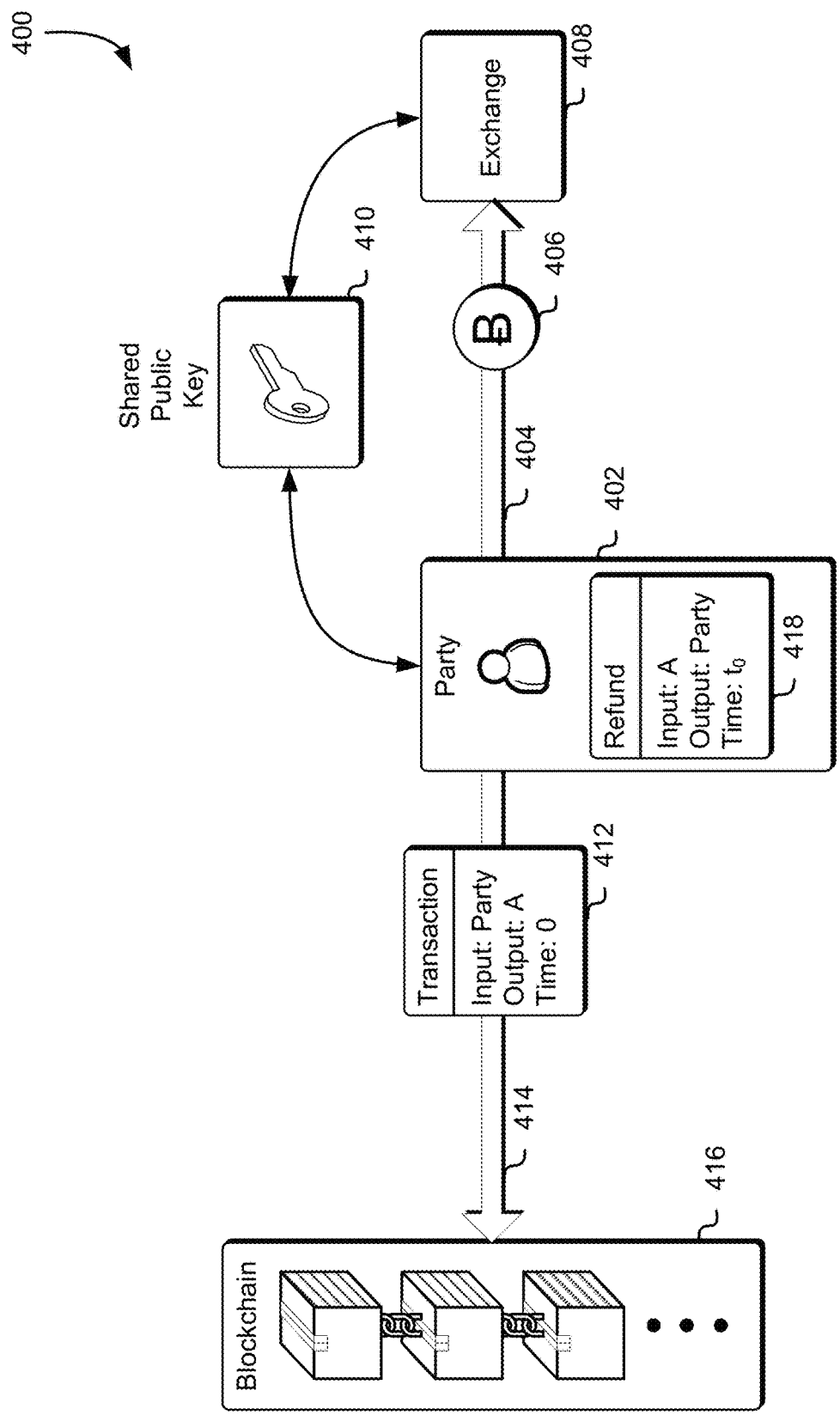
FIG. 4 illustrates a block diagram of an example environment where an attachment phase of an off-chain cryptocurrency transaction between untrusted parties is performed using an exchange platform.

FIG. 4 illustrates, in block diagram form, an example environment 400 where an attachment phase of an off-chain cryptocurrency transaction between untrusted parties is performed using an exchange platform. Each of the blocks of the block diagram of the example environment 400 is described in detail in connection with FIG. 5 and FIG. 6 below.

A party 402 may initiate 404 the attachment phase of the off-chain cryptocurrency transaction between untrusted parties by attaching a cryptocurrency deposit 406 to an exchange platform 408. In an embodiment, the party 402 is a node such as one of the nodes 102 described in connection with FIG. 1. The cryptocurrency deposit 406 may be based on a Bitcoin or may be based on some other such cryptocurrency as defined as attachable by the exchange platform 408.

The party 402 and the exchange platform 408 then cooperate to generate a shared public key 410, which the party 402 uses to create a transaction 412 that is broadcast 414 to the blockchain 416 as described herein. In an embodiment, the transaction 412 pays out from the cryptocurrency deposit 406 and is payable to any party that can produce the shared public key 410 (i.e., the transaction 412 pays an amount from the cryptocurrency deposit 406 to the shared public key 410). In an embodiment, the transaction 412 pays out from the cryptocurrency deposit 406 and is payable to any party that can provide a signature corresponding to the private key associated with the shared public key 410 (i.e., the transaction 412 pays an amount from the cryptocurrency deposit 406 to an entity that can provide a signature corresponding to the private key associated with the shared public key 410). In an embodiment, the transaction 412 pays out the entirety of the cryptocurrency deposit 406. In an embodiment, the transaction 412 pays out a portion of the cryptocurrency deposit 406 and one or more other transactions pay out other portions of the cryptocurrency deposit 406. The shared public key 410 is generated from the private keys of the party 402 and the exchange platform 408 and the public keys of the party 402 and the exchange platform 408 as described herein.

The party 402 also creates a refund transaction 418, which allows the party to recapture the cryptocurrency deposit 406 after some time has passed. In an embodiment, the refund transaction 418 time period (also referred to herein as a "timeout" and denoted as to) is based on a future time such as a time maintained by one or more computer systems. In one embodiment, the refund transaction time period is based on a future block height of the blockchain 416 (e.g., a number of blocks in the blockchain that is greater than the current number of blocks of the blockchain). It should be noted that the refund transaction time period may be substantially longer than the expected lifetime of the attachment. For example, if the expected attachment period is thirty days from the time when the attachment begins then the refund transaction 418 time period may be ninety days. The party saves the refund transaction 418 rather than broadcasting the refund transaction. The party may broadcast the refund transaction 418 when the timeout expires, as described below.

Although not illustrated in FIG. 4, the party 402 and the exchange platform 408 cooperate to sign the refund transaction 418 with the shared public key 410 using a two-party ECDSA protocol as described herein.

It should be noted that the security of the cryptocurrency deposit 406 is derived from the multiplicative splitting of the full private key combined with the use of the two-party ECDSA as described herein. The shared public key 410 is calculated during attachment but no party knows the full private key at any point until it is reconstructed at detachment as described below.

As key shares are updated as described below, the previous party's key share becomes invalid. However, the invalidation of the previous party's key share is dependent on the exchange platform 408 replacing the key share and removing all record of the previous values of the key share. If this protocol is followed, then the scheme is secure in the event of an attack because the current exchange platform 408 key share is useless in collusion with anyone but the current owner. Accordingly, the exchange platform 408 may not need to be trusted to maintain the security of the cryptocurrency deposit 406 provided the exchange platform 408 follows the protocol of replacing the key share and removing all record of the previous values of the key share.

If the exchange platform 408 acts dishonestly and keeps a record of previous iterations of the key share, then it is possible for the exchange platform 408 to collude with a previous owner of the funds to recreate the full key. This collusion is unlikely to be in the long term interest of the exchange platform 408 as a business. However a malicious actor could potentially take control of the exchange platform system and record all information as transactions are processed. In this instance the malicious actor would then also have to collude with a previous owner of the funds to recreate the full key. Because an attack requires either the simultaneous theft of both exchange and depositor keys or collusion with previous legitimate owners of funds, the opportunities for a malicious attacker to compromise the exchange platform 408 are limited.

As described above, in an embodiment, the exchange platform 408 may include a TEE. In such and embodiment, it is not even required that the exchange platform replaces the key share and removes all records of the previous values of the key share to maintain the security of the system. By operating the exchange protocol within a TEE, the exchange key share is further protected by the TEE. Additionally, the TEE can remotely attest to the other participants that the protocol is being followed within the TEE and that, as a result, it is impossible for the exchange platform 408 to discover or record the key shares. In such an embodiment, the exchange platform 408 is the only party required to invest in a TEE. Other participants would not require a TEE to implement the exchange protocol.

Figure 5:
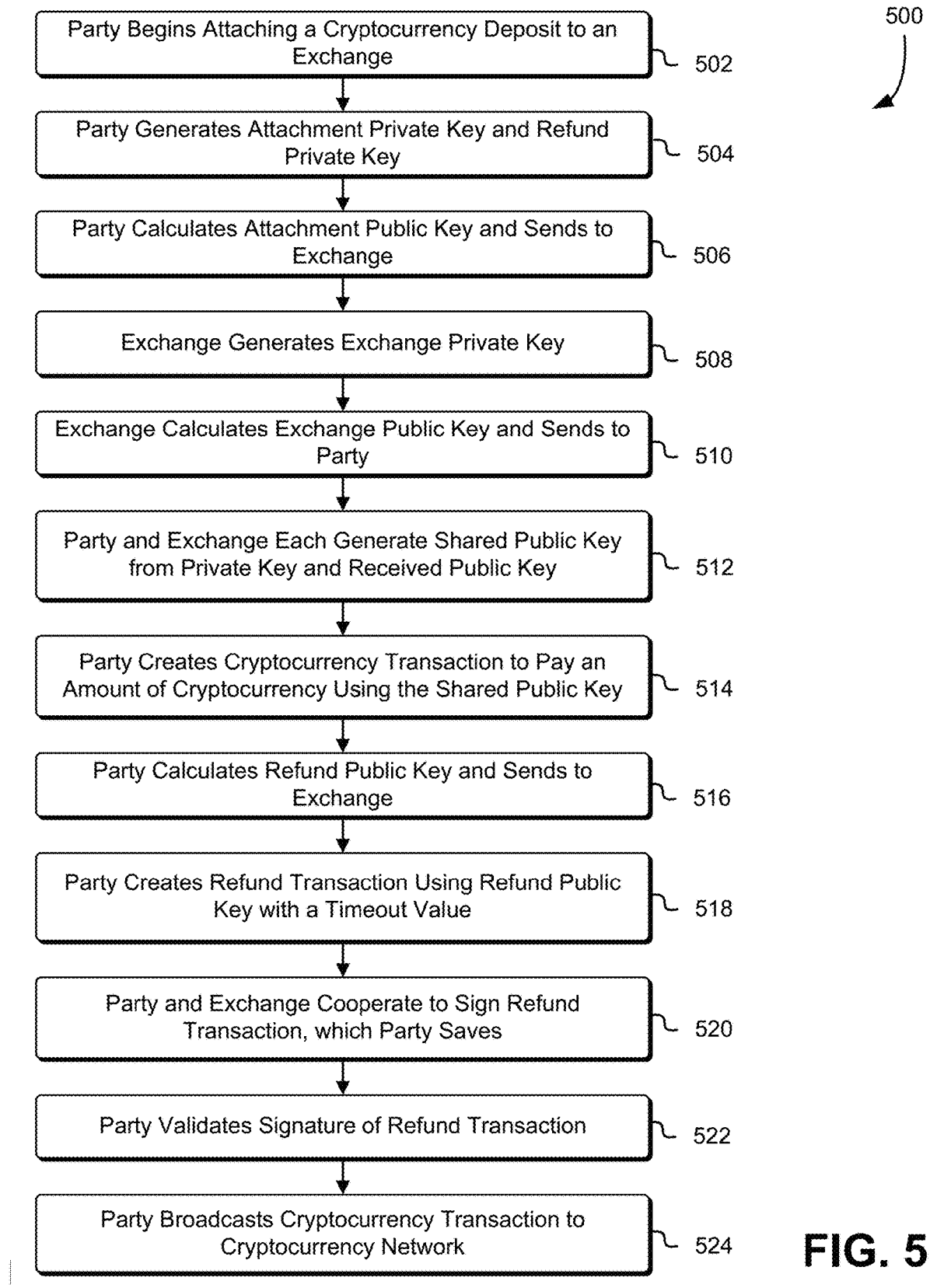
FIG. 5 illustrates a flowchart of an example process for performing an attachment phase of an off-chain cryptocurrency transaction between untrusted parties using an exchange platform.

FIG. 5 illustrates, in flowchart form, an example process 500 for performing an attachment phase of an off-chain cryptocurrency transaction between untrusted parties using an exchange platform. The process 500 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 500 for performing an attachment phase of an off-chain cryptocurrency transaction between untrusted parties using an exchange platform described in connection with FIG. 5.

In step 502 of the example process 500 for performing an attachment phase of an off-chain cryptocurrency transaction between untrusted parties using an exchange platform, a party begins attaching a cryptocurrency deposit to an exchange.

In step 504 of the example process 500 for performing an attachment phase of an off-chain cryptocurrency transaction between untrusted parties using an exchange platform, the party generates an attachment private key and a refund private key. In an embodiment, the party generates an attachment private key and a refund private key using a computationally secure pseudo-random number generator such as a pseudo-random number generator provided by a key generation service.

In step 506 of the example process 500 for performing an attachment phase of an off-chain cryptocurrency transaction between untrusted parties using an exchange platform, the party calculates an attachment public key corresponding to the attachment private key and sends the attachment public key to the exchange. In an embodiment, the party calculates an attachment public key corresponding to the attachment private key using elliptic curve cryptography (ECC) operations.

In step 508 of the example process 500 for performing an attachment phase of an off-chain cryptocurrency transaction between untrusted parties using an exchange platform, the exchange generates an exchange private key. In an embodiment, the exchange generates an exchange private key using a computationally secure pseudo-random number generator such as a pseudo-random number generator provided by a key generation service.

In step 510 of the example process 500 for performing an attachment phase of an off-chain cryptocurrency transaction between untrusted parties using an exchange platform, the exchange calculates an exchange public key corresponding to the exchange private key and sends the exchange public key to the party. In an embodiment, the exchange calculates an exchange public key corresponding to the exchange private key using ECC.

In step 512 of the example process 500 for performing an attachment phase of an off-chain cryptocurrency transaction between untrusted parties using an exchange platform, the party and the exchange each generate a shared public key from their private key and the received public key as described below. In an embodiment, the party and the exchange can verify the calculations to this point cooperatively by comparing their generated shared public key to the generated shared public key of the other (e.g., the party can compare the party's generated shared public key to the exchange's generated shared public key and vice versa). The values should be the same. Prior to verifying the calculations to this point cooperatively, the party's generated shared public key and the exchange's shared public key may be referred to herein as candidate shared keys. So, for example, the party's generated shared public key may be referred to herein as a first candidate shared key and the exchange's shared public key may be referred to herein as a second candidate shared key (or vice versa) and the party and the exchange can verify the calculations to this point cooperatively by verifying that the first candidate shared key is the same as the second candidate shared key.

In step 514 of the example process 500 for performing an attachment phase of an off-chain cryptocurrency transaction between untrusted parties using an exchange platform, the party creates a cryptocurrency transaction to pay an amount of cryptocurrency using the shared public key as described herein.

In step 516 of the example process 500 for performing an attachment phase of an off-chain cryptocurrency transaction between untrusted parties using an exchange platform, the party calculates a refund public key corresponding to the refund private key and sends the refund public key to the exchange. In an embodiment, the party calculates the refund public key corresponding to the refund private key using ECC.

In step 518 of the example process 500 for performing an attachment phase of an off-chain cryptocurrency transaction between untrusted parties using an exchange platform, the party creates a refund transaction with a timeout value using the refund public key so that the party can claim the refund after the appointed timeout value using the refund private key.

In step 520 of the example process 500 for performing an attachment phase of an off-chain cryptocurrency transaction between untrusted parties using an exchange platform, the party and the exchange cooperate to sign the refund transaction, which the party saves for future use as described below. In an embodiment, the party and the exchange cooperate to sign the refund transaction using two-party ECDSA based on the party's attachment private key and the exchange's attachment private key.

In step 522 of the example process 500 for performing an attachment phase of an off-chain cryptocurrency transaction between untrusted parties using an exchange platform, the party validates the cooperative signature of the refund transaction based on the party's attachment private key and the exchange's attachment public key.

In step 524 of the example process 500 for performing an attachment phase of an off-chain cryptocurrency transaction between untrusted parties using an exchange platform, the party broadcasts the cryptocurrency transaction to the cryptocurrency network (e.g., to the blockchain of the bitcoin network) as described herein.

Note that one or more of the operations performed in the example process 500 illustrated in FIG. 5 may be performed in various orders and combinations, including in parallel.

Figure 6:
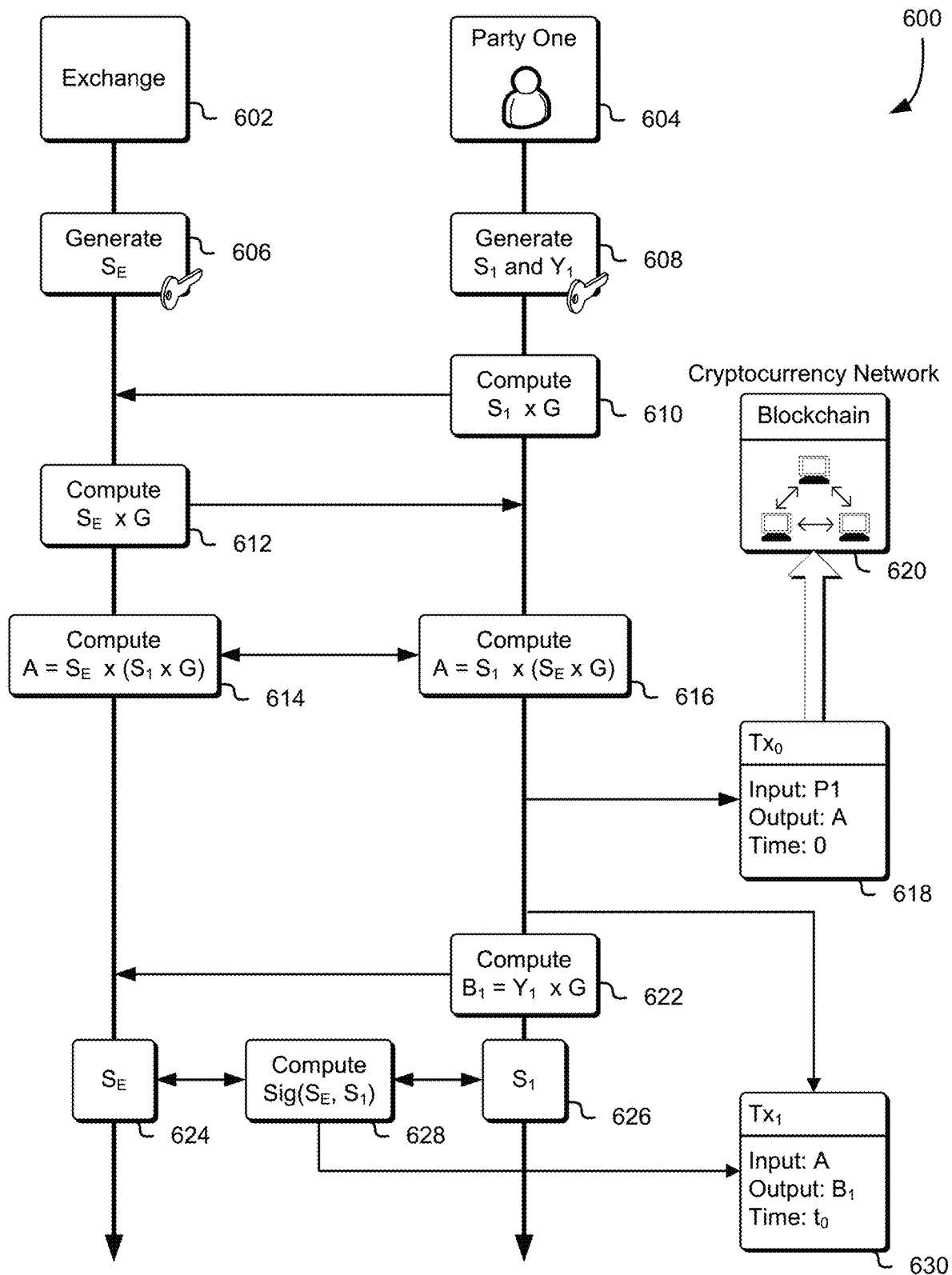
FIG. 6 illustrates a data flow diagram for an attachment phase of an off-chain cryptocurrency transaction between untrusted parties that is performed using an exchange platform.

FIG. 6 illustrates a data flow diagram 600 for an attachment phase of an off-chain cryptocurrency transaction between untrusted parties that is performed using an exchange platform. A party 604 begins the attachment phase of an off-chain cryptocurrency transaction and generates 608 an attachment private key ($S_1$) and a refund private key ($Y_1$). The party 604 then computes 610 an attachment public key ($S_1 \times G$) via ECC and sends the attachment public key to the exchange 602.

The exchange 602 generates 606 an exchange private key ($S_E$) and, in response to receiving the attachment public key ($S_1 \times G$) from the party 604, computes 612 an exchange attachment public key ($S_E \times G$) via ECC and sends the exchange attachment public key to the party 604.

The party 604 computes 616 a shared public key (A) by multiplying (via ECC) the party's attachment private key ($S_1$) by the exchange's attachment public key ($S_E \times G$). It should be noted that the party 604 does not have access to the exchange's attachment private key ($S_E$), but merely has access to the result of the computation of the exchange's attachment public key ($S_E \times G$), as received from the exchange 602.

The exchange 602 computes 614 a shared public key (A) by multiplying (via ECC) the exchange's attachment private key ($S_E$) by the party's attachment public key ($S_1 \times G$). As used herein, the symbol "×" (e.g., in computing $S_1 \times G$) denotes an elliptic curve multiplication operation where an integer (e.g., $S_1$) is multiplied by a "point" on the elliptic curve (e.g., G). It should be noted that the exchange 602 does not have access to the party's attachment private key ($S_1$), but merely has access to the result of the computation of the party's attachment public key ($S_1 \times G$), as received from the party 604. Due to the properties of ECC, the shared public key (A) of the exchange 602 ($S_E \times (S_1 \times G)$) is the same as the shared public key (A) of the party 604 ($S_1 \times (S_E \times G)$) and the shared public key (A) is the same as if the shared public key had been generated by computing a public key from the shared private key (S) where the shared private key is ($S_E * S_1$) or ($S_1 * S_E$). As used herein, the symbol "*" denotes standard multiplication (as opposed to elliptic curve multiplication, denoted by the symbol "×" as described above). Accordingly, A=S×G.

As illustrated in FIG. 6, the party 604 generates a cryptocurrency transaction 618 (denoted with $Tx_0$) and broadcasts the cryptocurrency transaction 618 to the cryptocurrency network 620. In an embodiment, the party 604 delays broadcasting the cryptocurrency transaction 618 to the cryptocurrency network 620 until after the party has validated the signature of the refund transaction and completed the attachment phase, as described in connection with FIG. 5.

The party 604 computes 622 a refund public key ($B_1$) from the refund private key ($Y_1$) via ECC (e.g., $B_1 = Y_1 \times G$), uses the refund public key ($B_1$) to create a refund transaction 630 (denoted as $Tx_1$) with a timeout value of $t_0$, and sends the refund public key ($B_1$) to the exchange so that the refund public key ($B_1$) can be used later if the refund transaction 630 is broadcast to the cryptocurrency network 620 as described below.

The party 604 and the exchange 602 cooperate to sign the refund transaction 630 by using a two-party ECDSA to compute 628 a signature ($Sig(S_E, S_1)$) based on input 624 of the exchange's attachment private key ($S_E$) and input 626 of the party's attachment private key ($S_1$), thereby completing the attachment phase.

Figure 7:
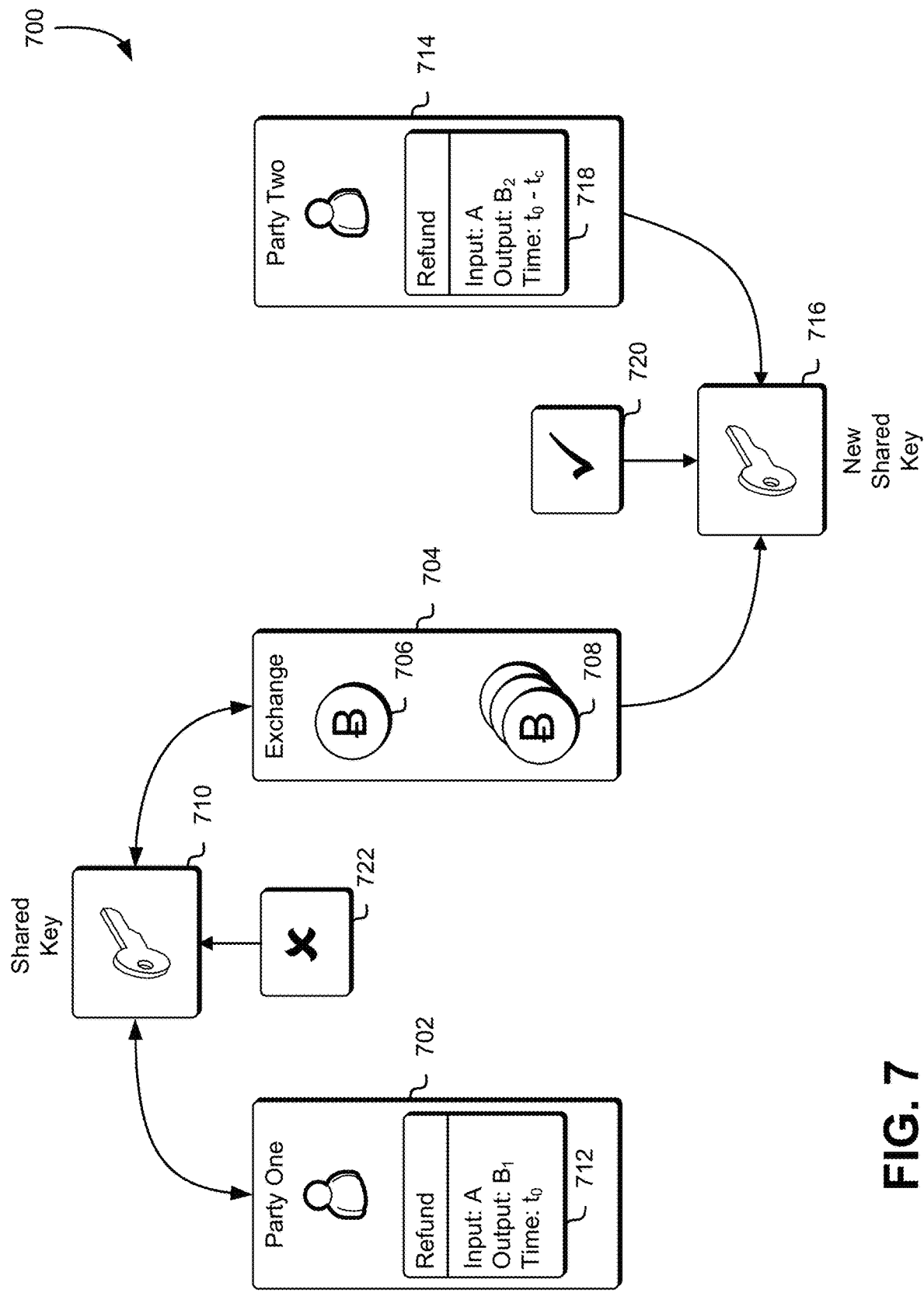
FIG. 7 illustrates a block diagram of an example environment where a transfer phase of an off-chain cryptocurrency transaction between untrusted parties is performed using an exchange platform.

FIG. 7 illustrates, in block diagram form, an example environment 700 where a transfer phase of an off-chain cryptocurrency transaction between untrusted parties is performed using an exchange platform. A first party 702 (denoted as "party one" in FIG. 7) has a shared key 710 with an exchange platform 704 for a cryptocurrency deposit 706, which may be one of a plurality of cryptocurrency deposits 708 attached to the exchange platform 704, as described herein. The first party 702 has a refund transaction 712 with a timeout $t_0$.

If the first party 702 transfers ownership of some or all of the cryptocurrency deposit 706 to a second party 714 (denoted as "party two" in FIG. 7) as described below in FIGS. 8-10, the second party 714 and the exchange platform 704 will generate a new shared key 716 using the techniques described herein and the second party 714 will generate a refund transaction 718 with a timeout $t_0 - t_c$, where $t_c$ is selected based at least in part on the desired attachment duration, as described above. In an embodiment, $t_c$ is chosen to be longer than the expected confirmation time for transactions in the Bitcoin network. For example, if the expected confirmation time for transactions in the Bitcoin network is one hour (i.e., six blocks at ten minutes each), then $t_c$ is chosen to be longer than one hour. When the first party 702 transfers ownership of some or all of the cryptocurrency deposit 706 to the second party 714 (e.g., when the first party transfers ownership of at least a portion of the cryptocurrency deposit), the operation of transferring ownership may be referred to herein as "reassociating the cryptocurrency deposit" or "reassociating the digital asset" (e.g., as "reassociating the digital asset from the first party to the second party" or "reassociating a portion of the digital asset from the first party to the second party").

For example, if the desired attachment duration is thirty days and to is chosen to be greater than the desired attachment duration (e.g., ninety days), then $t_c$ may be selected so as to allow sufficient time for a refund to a particular party to be generated while also allowing a sufficient number of transfers of ownership to occur before expiration of the cryptocurrency deposit 706. If, for example, $t_c$ is thirty minutes (or, in an embodiment, three blocks at ten minutes confirmation time per block), then approximately 2880 transfers of ownership can occur before $t_0 - n * t_c$ (n=2880) is less than thirty days (e.g., the desired attachment duration). In other words, if $t_c$ is thirty minutes, then there are forty-eight refund periods per twenty-four hour day, and 2880 refund periods in sixty days.

When the second party 714 and the exchange platform 704 generate the new shared key 716 and the new shared key 716 is validated 720, the shared key 710 becomes invalid 722 and it will no longer be useable to claim the cryptocurrency deposit 706. Thus, at any time, only one shared key (e.g., the shared key 710 or the new shared key 716) is valid and that valid shared key indicates current ownership of the cryptocurrency deposit 706.

Figure 8:
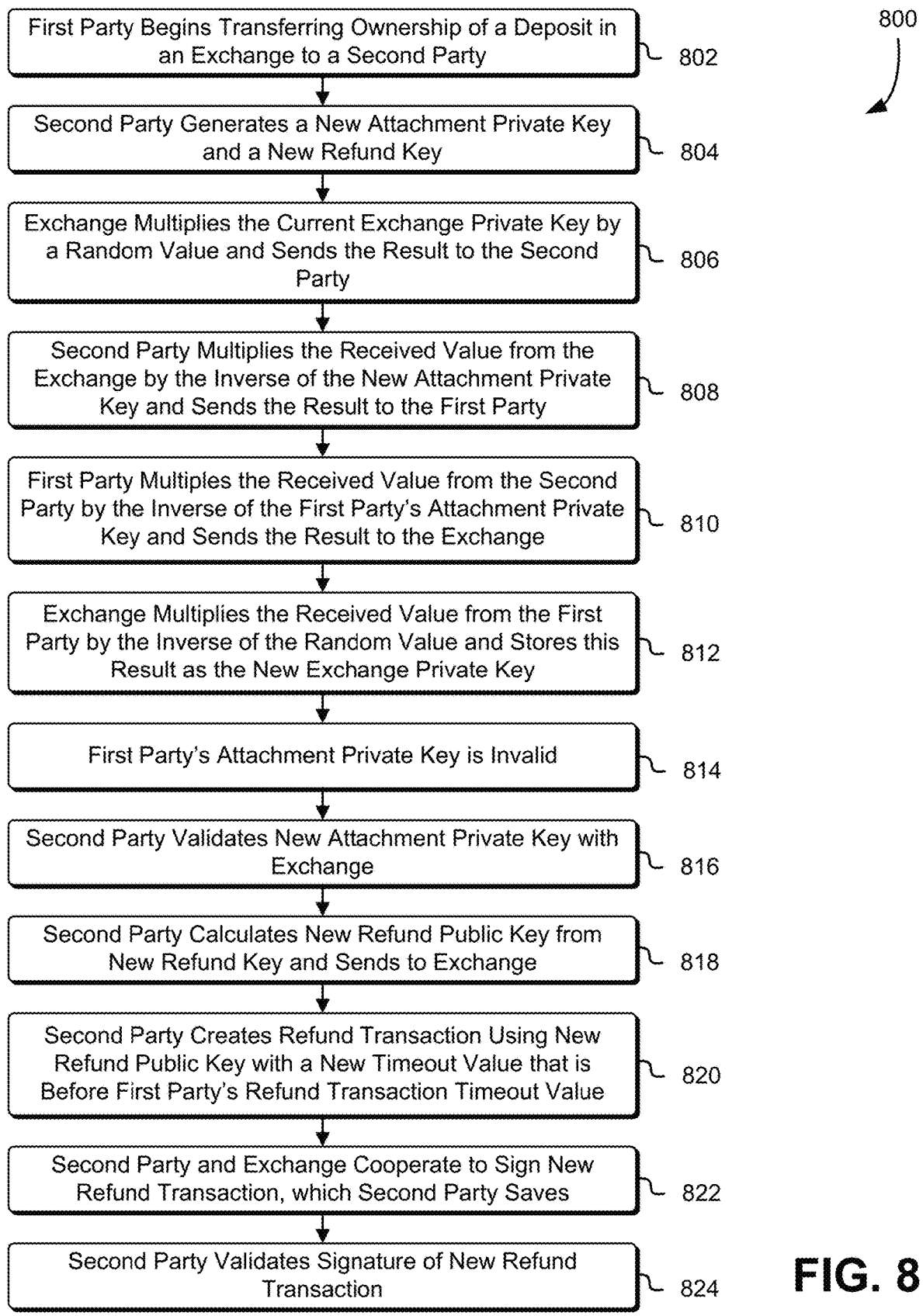
FIG. 8 illustrates a flowchart of an example process for performing a transfer phase of an off-chain cryptocurrency transaction between untrusted parties using an exchange platform.

FIG. 8 illustrates, in flowchart form, an example process 800 for performing a transfer phase of an off-chain cryptocurrency transaction between untrusted parties using an exchange platform. The process 800 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 800 for performing a transfer phase of an off-chain cryptocurrency transaction between untrusted parties using an exchange platform described in connection with FIG. 8.

In step 802 of the example process 800 for performing a transfer phase of an off-chain cryptocurrency transaction between untrusted parties using an exchange platform, the first party begins transferring ownership of a cryptocurrency deposit attached to an exchange to a second party.

In step 804 of the example process 800 for performing a transfer phase of an off-chain cryptocurrency transaction between untrusted parties using an exchange platform, the second party generates a new attachment private key and a new refund key. In an embodiment, the second party generates a new attachment private key and a new refund private key using a computationally secure pseudo-random number generator such as a pseudo-random number generator provided by a key generation service.

In step 806 of the example process 800 for performing a transfer phase of an off-chain cryptocurrency transaction between untrusted parties using an exchange platform, the exchange multiplies the current exchange private key by a random value and sends the result to the second party. The random value is a random value (also referred to herein as a random blinding nonce) so that the exchange private key is hidden from all parties (including the first party and the second party). In an embodiment, the random value is generated using a computationally secure pseudo-random number generator such as a pseudo-random number generator provided by a key generation service.

In step 808 of the example process 800 for performing a transfer phase of an off-chain cryptocurrency transaction between untrusted parties using an exchange platform, the second party multiplies the received value from the exchange by the inverse of the new attachment private key (i.e., the inverse of the second party's attachment private key) and sends the result of this multiplication to the first party.

In step 810 of the example process 800 for performing a transfer phase of an off-chain cryptocurrency transaction between untrusted parties using an exchange platform, the first party multiples the received value from the second party by the first party's attachment private key and sends the result of this multiplication to the exchange.

In step 812 of the example process 800 for performing a transfer phase of an off-chain cryptocurrency transaction between untrusted parties using an exchange platform, the exchange multiplies the received value from the first party by the inverse of the random value and stores this result as the new exchange private key. By multiplying the received value from the first party by the inverse of the random value, the exchange platform reverses the initial blinding of the random blinding nonce performed by the exchange in step 806. The resulting value is the exchange attachment private key combined with the inverse of the second party's attachment private key and the first party's attachment private key. This resulting value becomes the new attachment private key for the exchange and the exchange's old attachment private key is destroyed.

In step 814 of the example process 800 for performing a transfer phase of an off-chain cryptocurrency transaction between untrusted parties using an exchange platform, after step 812 of the example process 800 for performing a transfer phase of an off-chain cryptocurrency transaction between untrusted parties using an exchange platform, the second party's attachment private key becomes valid as described herein and the first party's attachment private key becomes invalid (i.e., the first party's attachment private key can no longer be used to distribute the cryptocurrency deposit). The first party's attachment private key becomes invalid due to the destruction of the previous exchange attachment private key because the first party's attachment private key no longer corresponds to the exchange private attachment key (e.g., the new exchange private attachment key).

In step 816 of the example process 800 for performing a transfer phase of an off-chain cryptocurrency transaction between untrusted parties using an exchange platform, the second party validates the new attachment private key cooperatively with the exchange as described above in connection with step 512 of FIG. 5 (e.g., both the second party and the exchange generate a shared public key and compare the generated values to ensure that they are the same).

In step 818 of the example process 800 for performing a transfer phase of an off-chain cryptocurrency transaction between untrusted parties using an exchange platform, the second party calculates a new refund public key from the new refund private key and sends the new refund public key to the exchange. In an embodiment, the second party calculates the new refund public key from the new refund private key using ECC.

In step 820 of the example process 800 for performing a transfer phase of an off-chain cryptocurrency transaction between untrusted parties using an exchange platform, the second party creates refund transaction using new refund public key with a new timeout value that is before first party's refund transaction timeout value as described herein.

In step 822 of the example process 800 for performing a transfer phase of an off-chain cryptocurrency transaction between untrusted parties using an exchange platform, the second party and the exchange cooperate to sign the new refund transaction, which the second party saves for future use as described herein.

In step 824 of the example process 800 for performing a transfer phase of an off-chain cryptocurrency transaction between untrusted parties using an exchange platform, the second party validates the cooperative signature of the new refund transaction based on the second party's attachment private key and the exchange's attachment public key.

Note that one or more of the operations performed in the example process 800 illustrated in FIG. 8 may be performed in various orders and combinations, including in parallel.

Figure 9:
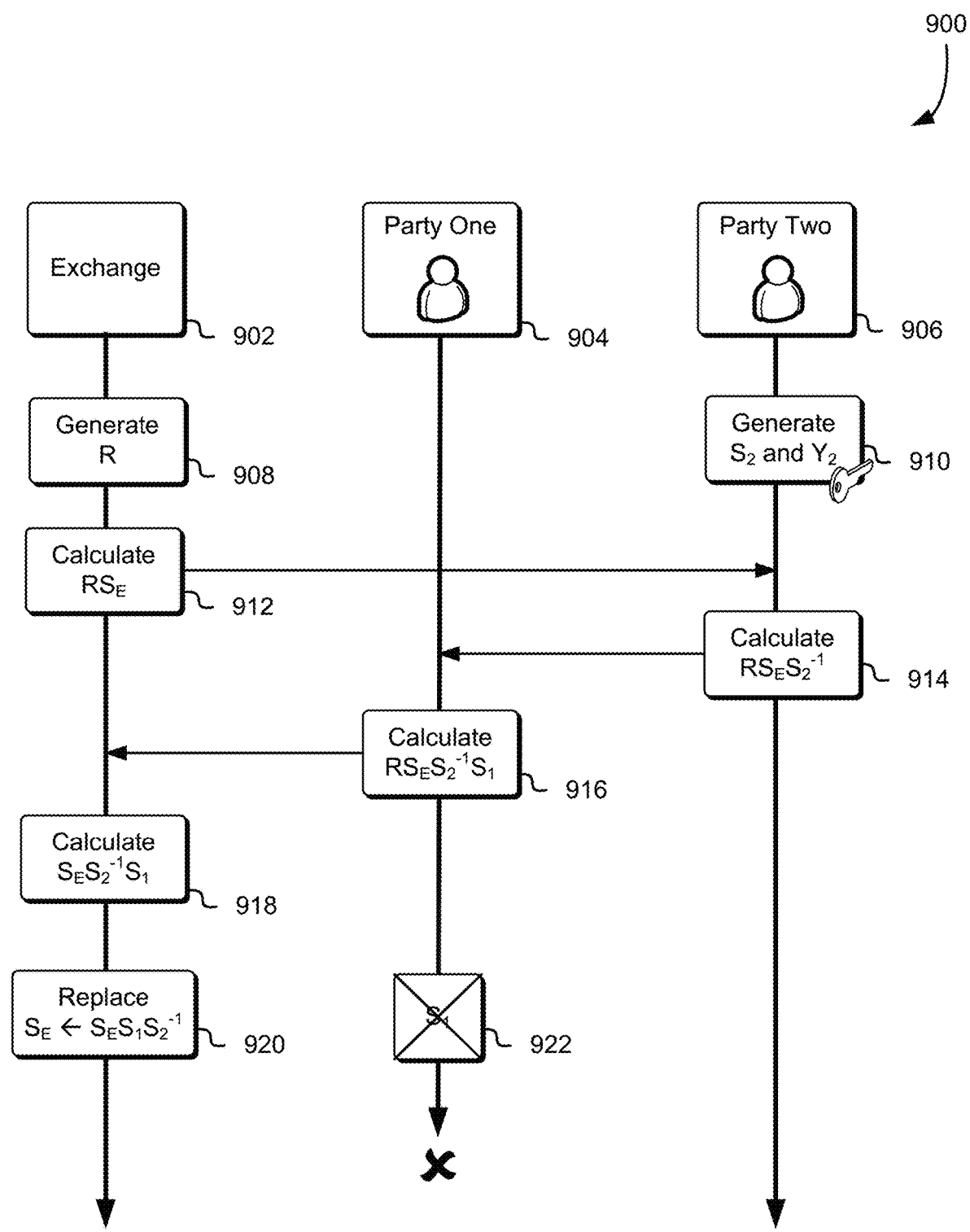
FIG. 9 illustrates a first part of a data flow diagram for a transfer phase of an off-chain cryptocurrency transaction between untrusted parties that is performed using an exchange platform.

FIG. 9 illustrates a first part 900 of a data flow diagram for a transfer phase of an off-chain cryptocurrency transaction between untrusted parties that is performed using an exchange platform. A first party 904 (denoted as "party one" in FIG. 9 and FIG. 10) begins the transfer phase of an off-chain cryptocurrency transaction to transfer ownership of a cryptocurrency deposit attached to an exchange 902. In the example illustrated in FIG. 9, the first party 904 is transferring ownership of the cryptocurrency deposit from the first party 904 to a second party 906 (denoted as "party two" in FIG. 9 and FIG. 10).

The exchange 902 generates 908 a random value (R) and uses the random value to calculate 912 a blinded attachment private key for the exchange ($RS_E$). As described above, the random value (which is also referred to herein as a random "blinding nonce") ensures that the attachment private key ($S_E$) for the exchange cannot be determined by any of the parties or by any malicious attacker. The exchange 902 sends the blinded attachment private key for the exchange ($RS_E$) to the second party 906.

The second party 906 generates 910 an attachment private key ($S_2$) and a refund private key ($Y_2$) as described above.

The second party 906 calculates 914 an intermediary key value by multiplying the blinded attachment key for the exchange ($RS_E$) by the modular inverse of the attachment private key ($S_2^{-1}$). The second party 906 sends the result of this multiplication ($RS_E S_2^{-1}$) to the first party 904.

The first party 904 calculates 916 a second intermediary key value by multiplying the value received from the second party ($RS_E S_2^{-1}$) by the attachment private key ($S_1$) of the first party 904. The first party 904 sends the result of this multiplication ($RS_E S_2^{-1} S_1$) to the exchange 902.

The exchange 902 calculates 918 a new attachment private key ($S_E S_2^{-1} S_1$) by multiplying the value ($RS_E S_2^{-1} S_1$) received from the first party 904 by the inverse ($R^{-1}$) of the random blinding nonce (R). When the exchange 902 replaces 920 the previous attachment private key ($S_E$) with the new attachment private key ($S_E S_2^{-1}\ S_1$), the private attachment key ($S_1$) of the first party 904 becomes invalid 922 as described herein.

It should be noted that, even though the private attachment key ($S_1$) of the first party 904 becomes invalid 922, the full shared private key (S) and the corresponding shared public key (A) remain unchanged but can only be constructed from the new private attachment key ($S_E^{new}$) of the exchange 902 and the private attachment key ($S_2$) of the second party 906. This is because:

$$S^{new} = S_E^{new} S_2 = (S_E^{old} S_2^{-1} S_1) S_2 = (S_E^{old} S_1 S_2^{-1}) S_2 = (S_E^{old} S_1)(S_2^{-1} S_2) = (S_E^{old} S_1) = S^{old}$$

but $S^{new}$ is not equal to $S_E^{new} S_1$ and $S_E^{old}$ no longer exists if the exchange 902 correctly operates the protocol.

Figure 10:
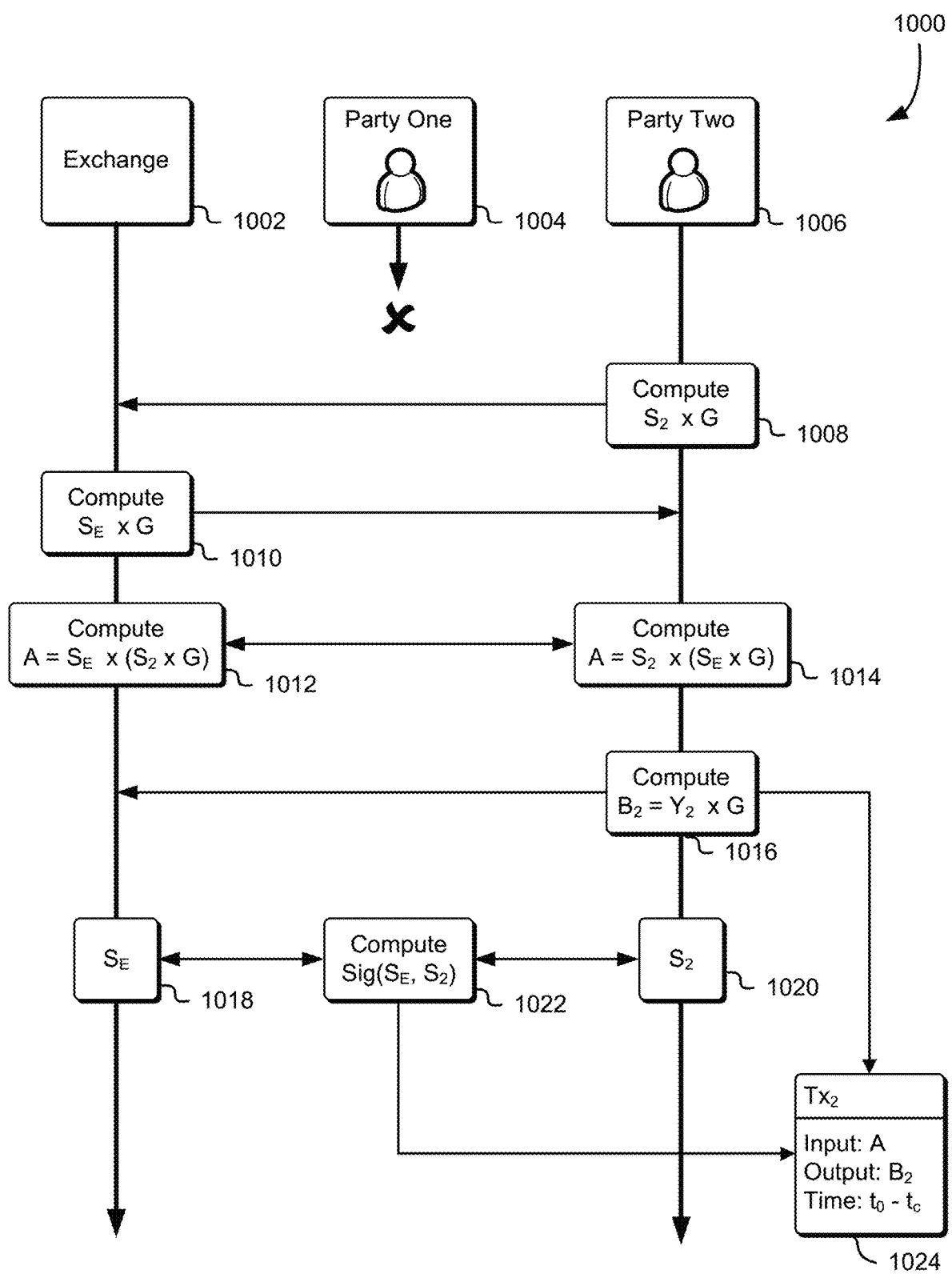
FIG. 10 illustrates a second part of a data flow diagram for a transfer phase of an off-chain cryptocurrency transaction between untrusted parties that is performed using an exchange platform.

FIG. 10 illustrates a second part 1000 of a data flow diagram for a transfer phase of an off-chain cryptocurrency transaction between untrusted parties that is performed using an exchange platform. The second part 1000 of the data flow diagram for a transfer phase of an off-chain cryptocurrency transaction between untrusted parties continues the first part 900 of the data flow diagram illustrated in FIG. 9, where the first party 904 (which corresponds to the first party 1004 in FIG. 10) is transferring ownership of the cryptocurrency deposit from the first party 904 to a second party 906 (which corresponds to the second party 1006 in FIG. 10).

In the second part 1000 of the data flow diagram for a transfer phase of an off-chain cryptocurrency transaction between untrusted parties that is performed using an exchange platform, the first party 1004 does not participate. The second party 1006 computes 1008 an attachment public key ($S_2 \times G$) corresponding to the attachment private key ($S_2$) using ECC and sends the attachment public key to the exchange 1002 (which corresponds to the exchange 902 described in connection with FIG. 9).

The exchange 1002 also computes 1010 an attachment public key ($S_E \times G$) corresponding to the new exchange attachment private key ($S_E$) and sends the attachment public key to the second party 1006.

The second party 1006 computes 1014 a shared public key (A) by multiplying (via ECC) the second party's attachment private key ($S_2$) by the exchange's attachment public key ($S_E \times G$). It should be noted that the second party 1006 does not have access to the exchange's attachment private key ($S_E$), but merely has access to the result of the computation of the exchange's attachment public key ($S_E \times G$), as received from the exchange 1002.

The exchange 1002 computes 1012 a shared public key (A) by multiplying (via ECC) the exchange's attachment private key ($S_E$) by the second party's attachment public key ($S_2 \times G$). It should be noted that the exchange 1002 does not have access to the second party's attachment private key ($S_2$), but merely has access to the result of the computation of the second party's attachment public key ($S_2 \times G$), as received from the second party 1006. Due to the properties of ECC, the shared public key (A) of the exchange 1002 ($S_E \times (S_2 \times G)$) is the same as the shared public key (A) of the second party 1006 ($S_2 \times (S_E \times G)$) and the shared public key (A) is the same as if the shared public key had been generated by computing a public key from the shared private key (S) where the shared private key is ($S_E * S_2$) or ($S_2 * S_E$). Accordingly, $A = S \times G$ as described above. In an embodiment, both A and the shared private key S remain unchanged after the operations of the transfer phase.

The second party 1006 computes 1016 a refund public key ($B_2$) from the refund private key ($Y_2$) via ECC (e.g., $B_2 = Y_2 \times G$), uses the refund public key ($B_2$) to create a refund transaction 1024 (denoted as $Tx_2$) with a timeout value of $t_0 - t_c$ as described herein, and sends the refund public key ($B_1$) to the exchange so that the refund public key ($B_1$) can be used later if the refund transaction 630 is broadcast to the cryptocurrency network 620 as described below.

The second party 1006 and the exchange 1002 cooperate to sign the refund transaction 1024 by using a two-party ECDSA to compute 1022 a signature ($Sig(S_E, S_2)$) based on input 1018 of the exchange's attachment private key ($S_E$) and input 1020 of the second party's attachment private key ($S_2$), thereby completing the transfer phase.

Figure 11:
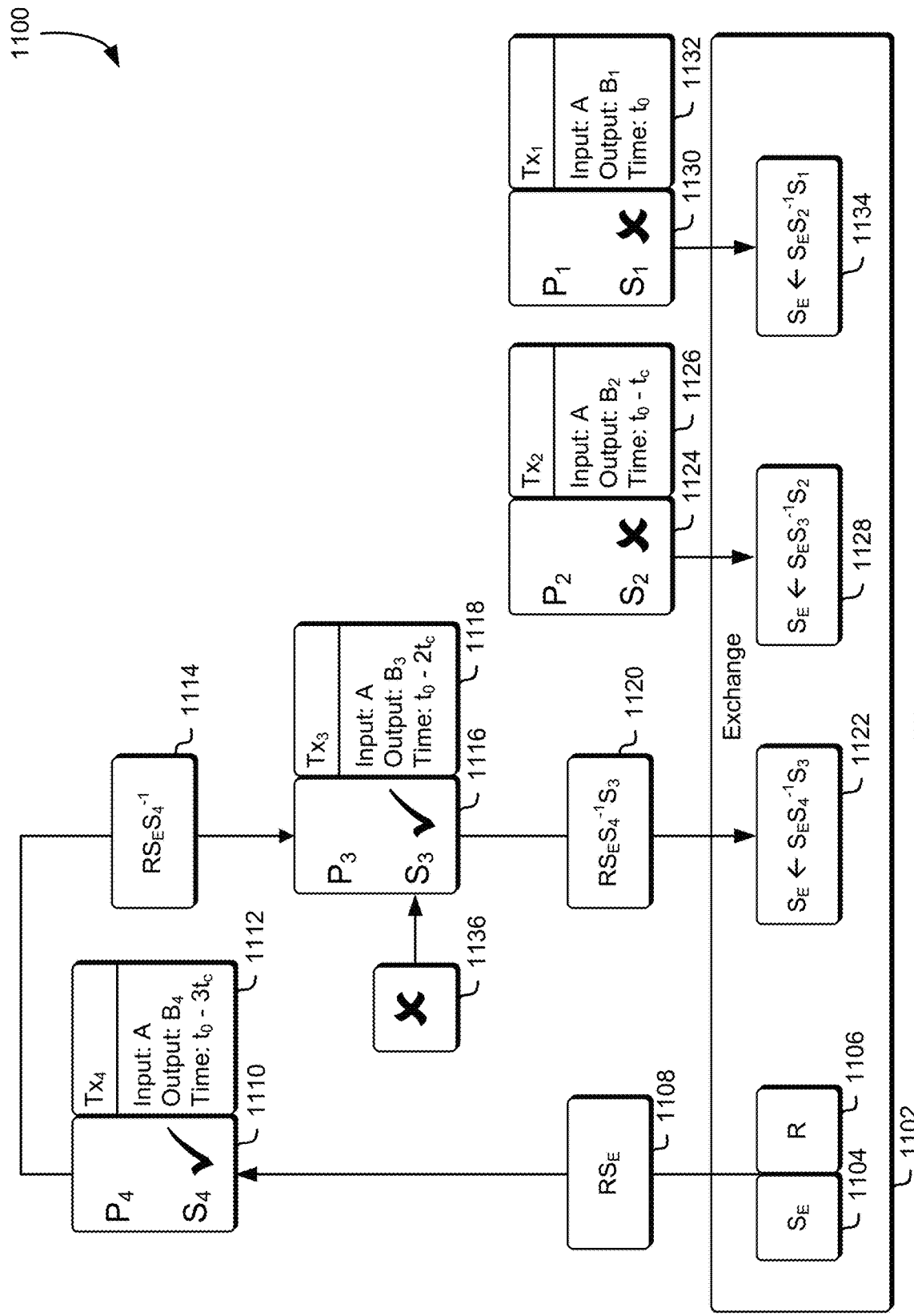
FIG. 11 illustrates a block diagram of an example environment where multiple transfers of an off-chain cryptocurrency transaction between untrusted parties are performed using an exchange platform.

FIG. 11 illustrates, in block diagram form, an example environment 1100 where multiple ownership transfers of an off-chain cryptocurrency transaction between untrusted parties are performed using an exchange platform. An exchange platform 1102 has a current attachment private key ($S_E$) 1104, which is multiplied by a random blinding nonce (R) 1106 as described herein. The result ($RS_E$) 1108 is provided to a party 1110 (in this case, a fourth party, denoted as "$P_4$"). In the example illustrated in FIG. 11, the party 1110 is the party that the ownership is being transferred to and the party 1116 (in this case a third party, denoted as "$P_3$") is the party that the ownership is being transferred from.

The party 1110 uses the result ($RS_E$) 1108 to generate a refund transaction 1112 (denoted as $Tx_4$) as described above with a timeout value of $t_0 - 3t_c$. The party 1110 combines the result ($RS_E$) 1108 with the multiplicative inverse ($S_4^{-1}$) of the attachment private key ($S_4$) of the party 1110 to produce an intermediary key value ($RS_E S_4^{-1}$) 1114 as described above.

The intermediary key value ($RS_E S_4^{-1}$) 1114 is provided to the party 1116, which has a previous refund transaction 1118 (denoted as $Tx_3$) with a timeout value of $t_0 - 2t_c$. The party 1116 uses the intermediary key value ($RS_E S_4^{-1}$) 1114 to produce an intermediary key value ($RS_E S_4^{-1} S_3$) 1120 by multiplying the intermediary key value ($RS_E S_4^{-1}$) 1114 by the attachment private key ($S_3$) of the party 1116.

The party 1116 sends the intermediary key value ($RS_E S_4^{-1} S_3$) 1120 to the exchange 1102, which extracts a new attachment private key ($S_E S_4^{-1} S_3$) from the intermediary key value ($RS_E S_4^{-1} S_3$) 1120. The exchange 1102 uses the new attachment private key ($S_E S_4^{-1} S_3$) from the intermediary key value ($RS_E S_4^{-1} S_3$) 1120 to replace 1122 the old attachment private key ($S_E$).

When the exchange 1102 uses the new attachment private key ($S_E S_4^{-1} S_3$) from the intermediary key value ($RS_E S_4^{-1} S_3$) 1120 to replace 1122 the old attachment private key ($S_E$), the attachment private key ($S_3$) from the party 1116 becomes invalid 1136.

In the example illustrated in FIG. 11, prior to when the exchange 1102 uses the new attachment private key ($S_E S_4^{-1} S_3$) from the intermediary key value ($RS_E S_4^{-1} S_3$) 1120 to replace 1122 the old attachment private key ($S_E$), the current attachment private key ($S_E$) 1104 is the same as the private attachment key ($S_E S_3^{-1} S_2$) 1128 generated as a result of the ownership transfer from the party 1124 (denoted as "$P_2$") to the party 1116. Similarly, the previous private attachment key ($S_E S_2^{-1} S_1$) 1134 is generated as a result of the ownership transfer from the party 1130 (denoted as "$P_1$") to the party 1124 (i.e., the first ownership transfer, described above).

In the example illustrated in FIG. 11, the refund transaction 1112 of the party 1110 is usable from $t_0 - 3t_c$ to $t_0 - 2t_c$, the previous refund transaction 1118 of the party 1116 is usable from $t_0 - 2t_c$ to $t_0 - t_c$, a refund transaction 1126 of the party 1124 is usable from $t_0 - t_c$ to $t_0$, and a refund transaction 1132 of the party 1130 (i.e., the first party) is usable after $t_0$.

In the example illustrated in FIG. 11, each time $S_E$ is updated, the previous key shares become invalid and may not be used even if $S_E$ is subsequently revealed. The speed of the transfer may be limited by a communication channel latency and/or by an execution time of the operations described herein. As may be contemplated, the costs of the arithmetic operations are negligible, and the ECC operations may be calculated in a fraction of a microsecond on modern CPUs. The two-party ECDSA is more inefficient and may take several seconds to compute, however the two-party ECDSA is only required for the refund transactions. Near instantaneous transfers may be made if each of the parties is on-line and responsive to requests associated with the transfer operations.

At each change of ownership, a new refund transaction is created and signed with a timeout set to $t_c$ sooner than the previously issued refund transaction. In order to be valid, the refund transaction must be broadcast to the blockchain network after the timeout expires as described below. Broadcasting the refund transaction to the blockchain network after the timeout expires invalidates the previous backups in the case that the exchange does not or cannot cooperate. Therefore, for the first owner $P_1$, the timeout is set to $t_0$, and for the owner $P_n$, the timeout is set to $t_0 - nt_c$. In an embodiment, is the responsibility of the exchange to keep a record of $t_0$, the value $t_c$, and the current n for each cryptocurrency deposit.

FIG. 12 illustrates, in block diagram form, an example environment 1200 where a detachment phase of an off-chain cryptocurrency transaction between untrusted parties is performed using an exchange platform. In the example illustrated in FIG. 12, a party 1202 (denoted as "party n+1") initiates detachment 1214 of a cryptocurrency deposit 1206 attached to an exchange 1204. As described above, the cryptocurrency deposit 1206 may be one of a plurality of cryptocurrency deposits 1208 attached to the exchange 1204.

In an embodiment, the party 1202 may initiate detachment 1214 of less than the full amount of the cryptocurrency deposit 1206 when, for example, previous transactions have transferred ownership of one or more portions of the cryptocurrency deposit 1206 as described above.

The party 1202 is designated as the current owner of the cryptocurrency deposit 1206 by the current shared key 1210, which is generated from the attachment private key ($S_E$) of the exchange and the attachment private key ($S_{n+1}$) of the party 1202 as described herein. In the example illustrated in FIG. 12, the party 1202 has a refund transaction 1212 with a timeout of $t_0 - nt_c$ and, as the party 1202 is the current owner, this refund transaction timeout is the earliest of the refund transactions of the previous owners.

When the party 1202 initiates detachment 1214 of some or all of the cryptocurrency deposit 1206, a transaction 1216 of blockchain 1218 is generated that provides the proceeds of the cryptocurrency deposit 1206 to the party 1202 and the cryptocurrency deposit 1206 is detached from the exchange 1204 so that no further off-chain cryptocurrency transactions using the cryptocurrency deposit 1206 can be performed. In an embodiment, the attachment private key ($S_E$) of the exchange 1204 is shredded or otherwise destroyed to ensure that no further off-chain cryptocurrency transactions using the cryptocurrency deposit 1206 can be performed.

FIG. 13 illustrates, in flowchart form, an example process 1300 for performing a detachment phase of an off-chain cryptocurrency transaction between untrusted parties using an exchange platform. The process 1300 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1300 for performing a detachment phase of an off-chain cryptocurrency transaction between untrusted parties using an exchange platform described in connection with FIG. 13.

In step 1302 of the example process 1300 for performing a detachment phase of an off-chain cryptocurrency transaction between untrusted parties using an exchange platform, the party requests detachment from the exchange as describe above.

In step 1304 of the example process 1300 for performing a detachment phase of an off-chain cryptocurrency transaction between untrusted parties using an exchange platform, it is determined whether the party is the current owner (i.e., whether the party is authorized to distribute the cryptocurrency deposit). In an embodiment, it is determined whether the party is the current by calculating the shared key from the attachment private key of the exchange ($S_E$) and the attachment private key of the party (e.g., $S_n$ for the $n^{th}$ party). In an embodiment, the current owner can be confirmed using the attachment public key of the current owner by combining the attachment public key of the current owner with the attachment private key of the exchange and comparing the result to the shared public key to ensure they are equal.

If, in step 1304 of the example process 1300 for performing a detachment phase of an off-chain cryptocurrency transaction between untrusted parties using an exchange platform, it is determined that the party is not the current owner, in step 1306 of the example process 1300 for performing a detachment phase of an off-chain cryptocurrency transaction between untrusted parties using an exchange platform, the detachment is not allowed. In an embodiment, the party requesting the detachment receives a message from the enclave indicating that the detachment is not allowed.

If, in step 1304 of the example process 1300 for performing a detachment phase of an off-chain cryptocurrency transaction between untrusted parties using an exchange platform, it is determined that the party is the current owner, in step 1308 of the example process 1300 for performing a detachment phase of an off-chain cryptocurrency transaction between untrusted parties using an exchange platform, it is determined whether the first timeout (i.e., the timeout with the earliest beginning time) has been reached as described herein. For example, if the fourth party is the current owner and the fourth party has a refund transaction with a timeout of $t_0-3t_c$, as described at least in connection with FIG. 11, if the current time is before the timeout of $t_0-3t_c$, the first timeout has not been reached and if the current time is after the timeout of $t_0-3t_c$, the first timeout has been reached.

If, in step 1308 of the example process 1300 for performing a detachment phase of an off-chain cryptocurrency transaction between untrusted parties using an exchange platform, it is determined that the first timeout has been reached, in step 1310 of the example process 1300 for performing a detachment phase of an off-chain cryptocurrency transaction between untrusted parties using an exchange platform, refund transactions have begun for the cryptocurrency deposit and accordingly, the detachment is not allowed as described in step 1306 of the example process 1300.

If, in step 1308 of the example process 1300 for performing a detachment phase of an off-chain cryptocurrency transaction between untrusted parties using an exchange platform, it is determined that the first timeout has not been reached, in step 1312 of the example process 1300 for performing a detachment phase of an off-chain cryptocurrency transaction between untrusted parties using an exchange platform, the detachment is allowed.

In step 1314 of the example process 1300 for performing a detachment phase of an off-chain cryptocurrency transaction between untrusted parties using an exchange platform, the exchange transmits current the exchange private key to the party requesting the detachment.

In step 1316 of the example process 1300 for performing a detachment phase of an off-chain cryptocurrency transaction between untrusted parties using an exchange platform, the party uses the exchange private key and the party's attachment private key to generate the shared key (e.g., the shared key (S) is generated by multiplying the private attachment key of the exchange ($S_E$) with the private attachment key of the party (e.g., $S_n$ for the $n^{th}$ party).

In step 1318 of the example process 1300 for performing a detachment phase of an off-chain cryptocurrency transaction between untrusted parties using an exchange platform, the party verifies the shared key with the exchange as described herein.

In step 1320 of the example process 1300 for performing a detachment phase of an off-chain cryptocurrency transaction between untrusted parties using an exchange platform, the party uses the shared key to generate a transaction to spend the UTXO from the cryptocurrency deposit from the current time until the earliest timeout is reached. That is, the party uses the shared key to generate a transaction at any time before the earliest timeout is reached. If the party waits to use the shared key to generate a transaction after the earliest timeout is reached, the transaction may fail due to intervening refunds. "Spending" an UTXO is meant in the technical sense where, for example, the UTXO is used as an input into a transaction whose recording on the blockchain causes the UTXO to be prevented from being used as an input for another transaction on the blockchain.

Note that one or more of the operations performed in the example process 1300 illustrated in FIG. 13 may be performed in various orders and combinations, including in parallel.

FIG. 14 illustrates, in block diagram form, an example environment 1400 where a refund phase of an off-chain cryptocurrency transaction between untrusted parties is performed using an exchange platform. In the example illustrated in FIG. 14, the current time 1402 is $t_0-nt_c$ where to is the first timeout period, and is longer than the attachment period (e.g., to is ninety days for an attachment period of thirty days) and $t_c$ is the refund time (e.g., thirty minutes or three blocks).

If, for example, there are 481 parties (or 480 ownership transfers), then the current time 1402 is $t_0-480*t_c$, which is ninety days minus 480 times thirty minutes, or eighty days after the attachment of the cryptocurrency deposit.

In the example illustrated in FIG. 14, none of the parties have detached the cryptocurrency deposit and the refund phase begins based on the current time. During the first refund period 1406 of a refund period timeline 1404, the party 1408 (e.g., the $481^{st}$ party) may broadcast 1410 its refund transaction to the blockchain 1412 to obtain a refund of the cryptocurrency deposit. During the second refund period 1414, the party 1416 (e.g., the $480^{th}$ party) may broadcast 1418 its refund transaction to the blockchain 1412 to obtain a refund of the cryptocurrency deposit, assuming that during the first refund period 1406, the party 1408 did not broadcast 1410 its refund transaction to the blockchain 1412 to obtain a refund of the cryptocurrency deposit. It is during the second refund period 1414 that the exchange protocol may recover from an ineffective transfer of ownership (e.g., the transfer of ownership from the party 1416 to the party 1408).

The refund process continues until one of the parties successfully broadcasts its refund transaction to the blockchain 1412 during its refund period. If the refund period 1420 expires and the party 1422 (e.g., the $2^{nd}$ party) does not broadcast 1424 its refund transaction to the blockchain 1412, the party 1428 (e.g., the $1^{st}$ party) can broadcast 1430 its refund transaction during the last refund period 1426. In an embodiment, the exchange will automatically generate a refund transaction to the first party after the end of the last refund period 1426 (e.g., after the time $t_0$ is reached).

It should be noted that the refund transaction can be mined (i.e., spent on the blockchain) at any time after the timeout (also referred to as a "locktime" in a Bitcoin network). That is, a party is not restricted to mining the refund transaction during the refund period. Once the timeout has passed for a party, the transaction remains valid from that point on. In general, the party with the soonest timeout will submit their refund transaction first, after the timeout has passed for the party. Once that first refund transaction is confirmed, all other refund transaction that reference the same UTXO for become invalid. The party with the soonest timeout is incentivised to submit their refund transaction soonest because delaying this submission until, for example, the next timeout (e.g., the timeout for the next party) engenders the risk that the next party will mine the refund transaction. For example, during the second refund period 1414, both the party 1408 and the party 1416 may broadcast a refund transaction to the blockchain 1412 to obtain a refund of the cryptocurrency deposit.

As described herein, the most recent refund transaction is the one that can mined into the blockchain soonest. Accordingly, an older refund transaction (i.e., a refund transaction that has a later timeout) becomes redundant because the newer refund transaction becomes valid sooner and can thus be spent first.

FIG. 15 illustrates, in flowchart form, an example process 1500 for performing a refund phase of an off-chain cryptocurrency transaction between untrusted parties using an exchange platform. The process 1500 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1500 for performing a refund phase of an off-chain cryptocurrency transaction between untrusted parties using an exchange platform described in connection with FIG. 15.

In step 1502 of the example process 1500 for performing a refund phase of an off-chain cryptocurrency transaction between untrusted parties using an exchange platform, the first timeout period has been reached and refund transaction may begin according to the priority of the requesting party (e.g., newer owners have refund priority over older owners) as described herein.

In step 1504 of the example process 1500 for performing a refund phase of an off-chain cryptocurrency transaction between untrusted parties using an exchange platform, the first party (e.g., the newest owner) is selected.

In step 1506 of the example process 1500 for performing a refund phase of an off-chain cryptocurrency transaction between untrusted parties using an exchange platform, it is determined whether the timeout for the selected party has begun based at least in part on the time $t_0$ and the number of refund periods $t_c$ that have been used.

If, in step 1506 of the example process 1500 for performing a refund phase of an off-chain cryptocurrency transaction between untrusted parties using an exchange platform, it is determined that the timeout for the selected party has not begun, in step 1508 of the example process 1500 for performing a refund phase of an off-chain cryptocurrency transaction between untrusted parties using an exchange platform, a refund transaction is not allowed at the present time. As may be contemplated, if the timeout period for the earliest party has not begun, then the timeout periods for any of the later parties have also not yet begun and, accordingly no party may seek a refund.

If, in step 1506 of the example process 1500 for performing a refund phase of an off-chain cryptocurrency transaction between untrusted parties using an exchange platform, it is determined that the timeout for the selected party has begun, in step 1510 of the example process 1500 for performing a refund phase of an off-chain cryptocurrency transaction between untrusted parties using an exchange platform, it is determined whether the next timeout has been reached (i.e., whether the timeout for the selected party has ended) based at least in part on the time $t_0$ and the number of refund periods $t_c$ that have been used.

If, in step 1510 of the example process 1500 for performing a refund phase of an off-chain cryptocurrency transaction between untrusted parties using an exchange platform, it is determined that the next timeout has been reached (i.e., that the timeout for the selected party has ended), in step 1512 of the example process 1500 for performing a refund phase of an off-chain cryptocurrency transaction between untrusted parties using an exchange platform, it is determined whether there is an earlier party to select (e.g., a party that is earlier in the ownership chain).

If, in step 1512 of the example process 1500 for performing a refund phase of an off-chain cryptocurrency transaction between untrusted parties using an exchange platform, it is determined that there is an earlier party to select, the next earlier party is selected as described above in step 1504 of the example process 1500 for performing a refund phase of an off-chain cryptocurrency transaction between untrusted parties using an exchange platform.

If, in step 1512 of the example process 1500 for performing a refund phase of an off-chain cryptocurrency transaction between untrusted parties using an exchange platform, it is determined that there is not an earlier party to select, in step 1514 of the example process 1500 for performing a refund phase of an off-chain cryptocurrency transaction between untrusted parties using an exchange platform, the earliest party is selected and the example process 1500 for performing a refund phase of an off-chain cryptocurrency transaction between untrusted parties using an exchange platform continues at step 1516, described below.

If, in step 1510 of the example process 1500 for performing a refund phase of an off-chain cryptocurrency transaction between untrusted parties using an exchange platform, it is determined that the next timeout has been reached (i.e., that the timeout for the selected party has ended), in step 1516 of the example process 1500 for performing a refund phase of an off-chain cryptocurrency transaction between untrusted parties using an exchange platform, the selected owner with a current refund period as determined in step 1506 and step 1510 broadcasts the saved refund transaction to the blockchain.

In step 1518 of the example process 1500 for performing a refund phase of an off-chain cryptocurrency transaction between untrusted parties using an exchange platform, the selected owner with a current refund period as determined in step 1506 and step 1510 receives the UTXO for the broadcasted refund transaction as described herein.

Note that one or more of the operations performed in the example process 1500 illustrated in FIG. 15 may be performed in various orders and combinations, including in parallel.

Figure 16:
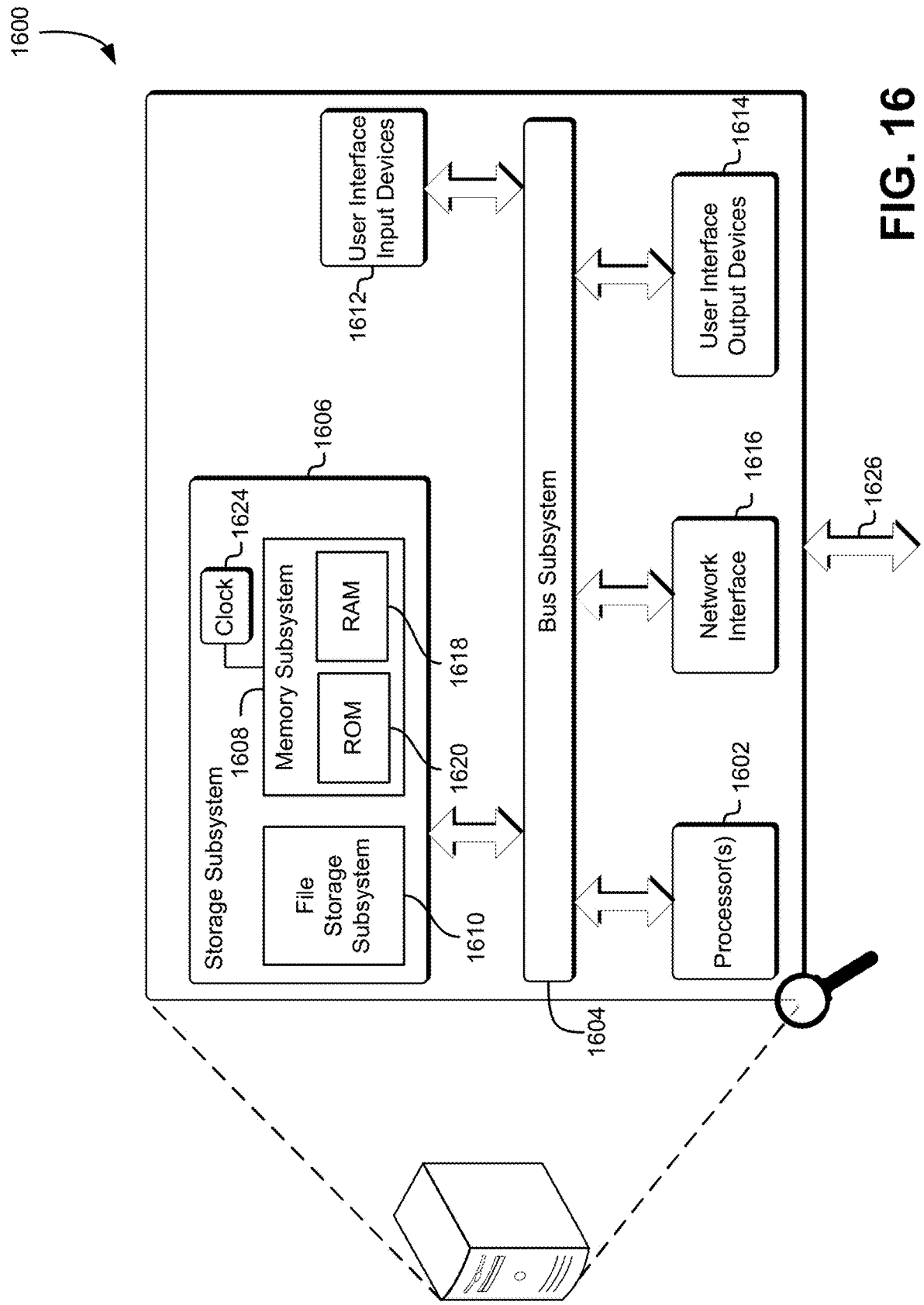
FIG. 16 illustrates a block diagram of an example environment where various embodiments can be implemented.

FIG. 16 illustrates, in block diagram form, an example computing device 1600 where various embodiments of the invention can be implemented. FIG. 16 illustrates a simplified block diagram of an example computing device 1600 that may be used to practice at least one embodiment of the present disclosure. In various embodiments, the example computing device 1600 may be used to implement any of the systems or methods illustrated herein and described above. For example, the example computing device 1600 may be configured for use as a data server, a web server, a portable computing device, a personal computer, or any electronic computing device. As shown in FIG. 16, the example computing device 1600 may include one or more processors 1602 that may be configured to communicate with, and are operatively coupled to, a number of peripheral subsystems via a bus subsystem 1604. The processors 1602 may be utilized to implement the exchange protocol as described herein. These peripheral subsystems may include a storage subsystem 1606, comprising a memory subsystem 1608 and a file storage subsystem 1610, one or more user interface input devices 1612, one or more user interface output devices 1614, and a network interface subsystem 1616. Such storage subsystem 1606 may be used for temporary or long-term storage of information associated with transactions or operations described in the present disclosure.

The bus subsystem 1604 may provide a mechanism for enabling the various components and subsystems of the example computing device 1600 to communicate with each other as intended. Although the bus subsystem 1604 is shown schematically as a single bus, alternative embodiments of the bus subsystem may utilize multiple busses. The network interface subsystem 1616 may provide an interface to other computing devices and networks. The network interface subsystem 1616 may serve as an interface for receiving data from, and transmitting data to, other systems from the example computing device 1600. For example, the network interface subsystem 1616 may enable a user to connect the device to a wireless network or some other network such as those described herein. The bus subsystem 1604 may be utilized for communicating data associated with transactions or operations described in the present disclosure to the one or more processors 1602 and/or to other entities outside of the system via the network interface subsystem 1616.

The user interface input devices 1612 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 1600. The one or more user interface output devices 1614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1600. The one or more output devices 1614 may be used, for example, to present user interfaces to facilitate user interaction with applications performing processes described herein and variations therein, when such interaction may be appropriate.

The storage subsystem 1606 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, and may be stored in the storage subsystem 1606. These application modules or instructions may be executed by the one or more processors 1602. The storage subsystem 1606 may additionally provide a repository for storing data used in accordance with the present disclosure. The storage subsystem 1606 may comprise a memory subsystem 1608 and a file/disk storage subsystem 1610.

The memory subsystem 1608 may include a number of memories, including a main random access memory (RAM) 1618 for storage of instructions and data during program execution and a read only memory (ROM) 1620 in which fixed instructions may be stored. The file storage subsystem 1610 may provide a non-transitory persistent (non-volatile) storage for program and data files (also referred to herein as a non-transitory computer-readable storage medium), and may include a hard disk drive, a floppy disk drive along with associated removable media, a Compact Disk Read Only Memory (CD-ROM) drive, an optical drive, removable media cartridges, and other like storage media.

The example computing device 1600 may include at least one local clock 1624. The local clock 1624 may be a counter that represents the number of ticks that have transpired from a particular starting date and may be located integrally within the example computing device 1600. The local clock 1624 may be used to synchronize data transfers in the processors for the example computing device 1600 and all of the subsystems included therein at specific clock pulses and may be used to coordinate synchronous operations between the example computing device 1600 and other systems in a datacenter. In one embodiment, the local clock 1624 is an atomic clock. In another embodiment, the local clock is a programmable interval timer.

The example computing device 1600 may be of various types, including a portable computer device, tablet computer, a workstation, or any other device described herein. Additionally, the example computing device 1600 may include another device that may be connected to the example computing device 1600 through one or more ports 1626 (e.g., USB, a headphone jack, Lightning connector, etc.). The device that may be connected to the example computing device 1600 may include a plurality of ports configured to accept fiber-optic connectors. Accordingly, device that may be connected to the example computing device 1600 may be configured to convert optical signals to electrical signals that may be transmitted through the port connecting the device to the example computing device 1600 for processing. Due to the ever-changing nature of computers and networks, the description of the example computing device 1600 depicted in FIG. 16 is intended only as a specific example for purposes of illustrating an embodiment of the device. Many other configurations having more or fewer components than the system depicted in FIG. 16 are possible.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory (i.e., may be a non-transitory computer-readable storage medium).

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

It should be noted that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method for performing an off-chain transaction comprising:
   attaching, by a first entity, a digital asset to an exchange platform;
   computing a first shared key using a key associated with the first entity and a first key associated with the exchange platform;
   causing a first blockchain transaction to be recorded to a blockchain by at least:
      generating the first blockchain transaction to be unlockable by any computer system having access to the first shared key, wherein the first blockchain transaction pays out from the digital asset; and
      broadcasting the first blockchain transaction to a blockchain network;
   initiating, by the first entity, transfer of ownership of the digital asset attached to the exchange platform from the first entity to a second entity;
   computing a second key associated with the exchange platform using a key associated with a second entity;
   computing a second shared key using the key associated with the second entity and the second key associated with the exchange platform, wherein the second shared key is equal to the first shared key;
   replacing the first key associated with the exchange platform with the second key associated with the exchange platform; and
   detaching, by the second entity, a deposit from the exchange platform using the second shared key if it is determined that the second entity is a current owner of the digital asset.

2. A computer-implemented method according to claim 1, wherein
   to determine if the second entity is the current owner of the digital asset the key associated with the second entity is combined with a current key associated with the exchange platform to calculate a shared key, wherein if the shared key is equal to the second shared key then the second entity is the current owner of the digital asset.

3. A computer-implemented method according to claim 1, wherein the method further comprises:
   generating a first refund transaction payable to the first entity using a first refund key; and
   broadcasting the first refund transaction to the blockchain network after a first time period.

4. A computer-implemented method according to claim 3, wherein the first refund transaction is cooperatively signed by the exchange platform and the first entity using a two-party elliptic curve digital signature algorithm.

5. A computer-implemented method according to claim 3, wherein the method further comprises:
   generating a second refund transaction payable to the second entity using a second refund key; and
   broadcasting the second refund transaction to the blockchain network after a second time period.

6. A computer-implemented method claimed in claim 5, wherein the second time period is less than the first time period.

7. A computer-implemented method according to 5,
   wherein the second refund transaction is cooperatively signed by the exchange platform and the second entity using a two-party elliptic curve digital signature algorithm.

8. A computer-implemented method according to claim 1, wherein computing the first shared key comprises:
   computing a first candidate shared key by at least:
      computing a first public key corresponding to the first key associated with the exchange platform using elliptic curve cryptography;
      providing the first public key to the first entity; and
      computing the first candidate shared key from the first public key and the key associated with the first entity using elliptic curve cryptography; and
   computing a second candidate shared key by at least:
      computing a second public key corresponding to the key associated with the first entity using elliptic curve cryptography;
      providing the second public key to the exchange platform; and
      computing the second candidate shared key from the second public key and the first key associated with the exchange platform using elliptic curve cryptography; and
   verifying that the first candidate shared key is the same as the second candidate shared key.

9. A computer-implemented method according to claim 1, wherein the second shared key is computed by at least:
   computing a first candidate shared key by at least:
      computing a first public key corresponding to the second key associated with the exchange platform using elliptic curve cryptography;
      providing the first public key to the second entity; and
      computing the first candidate shared key from the first public key and the key associated with the second entity using elliptic curve cryptography;
   computing a second candidate shared key by at least:
      computing a second public key corresponding to the key associated with the second entity using elliptic curve cryptography;
      providing the second public key to the exchange platform; and
      computing the second candidate shared key from the second public key and the second key associated with the exchange platform using elliptic curve cryptography; and
   verifying that the first candidate shared key is the same as the second candidate shared key.

10. A computer-implemented method according to claim 1, wherein replacing the first key associated with the exchange platform with the second key of the exchange platform comprises:
   multiplying the first key associated with the exchange platform by a random value to produce a blinded first key associated with the exchange platform;
   providing the blinded first key associated with the exchange platform to the second entity;
   multiplying the blinded first key associated with the exchange platform by a multiplicative inverse of the key associated with the second entity to produce a first intermediary key;
   providing the first intermediary key to the first entity;
   multiplying the first intermediary key by the key associated with the first entity to produce a second intermediary key;

providing the second intermediary key to the exchange platform; and multiplying the second intermediary key by a multiplicative inverse of the random value to generate the second key associated with the exchange platform.

11. A computer-implemented method according to claim 1, wherein replacing the first key associated with the exchange platform with the second key associated with the exchange platform invalidates the first key associated with the exchange platform.

12. A computer-implemented method according to claim 1, wherein:

the key associated with the first entity is a private key securely maintained by the first entity;

the first key associated with the exchange platform is a private key securely maintained by the exchange platform;

the key associated with the second entity is a private key securely maintained by the second entity; and the second key associated with the exchange platform is a private key securely maintained by the exchange platform.

13. A computer-implemented method according to claim 1, wherein the exchange platform includes a trusted execution environment that:

stores the first key associated with the exchange platform;

stores the second key associated with the exchange platform; and provides a remote attestation that an exchange protocol associated with the exchange platform is being followed by the exchange platform.

14. A system, comprising:

a processor; and memory including executable instructions that, as a result of execution by the processor, causes the system to perform a computer-implemented method of claim 1.

15. A non-transitory computer-readable storage medium having stored thereon executable instructions that, as a result of being executed by a processor of a computer system, cause the computer system to at least perform a computer-implemented method of claim 1.

* * * * *